(12) United States Patent
Yaguchi

(10) Patent No.: US 7,099,042 B2
(45) Date of Patent: Aug. 29, 2006

(54) IMAGE PROCESSING APPARATUS

(75) Inventor: Hiroyuki Yaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 879 days.

(21) Appl. No.: 09/795,122

(22) Filed: Mar. 1, 2001

(65) Prior Publication Data
US 2001/0024518 A1 Sep. 27, 2001

(30) Foreign Application Priority Data
Mar. 3, 2000 (JP) ............................. 2000-059191

(51) Int. Cl.
G06K 9/00 (2006.01)
(52) U.S. Cl. ..................... 358/1.9; 358/522; 382/168
(58) Field of Classification Search ................ 382/168, 382/169, 162, 167; 358/518, 521, 522, 1.9, 358/2.1
See application file for complete search history.

(56) References Cited
U.S. PATENT DOCUMENTS
6,118,895 A * 9/2000 Hirota et al. ............... 382/165
6,198,841 B1 * 3/2001 Toyama et al. ............. 382/164
6,807,301 B1 * 10/2004 Tanaka ....................... 382/169

FOREIGN PATENT DOCUMENTS
JP 1-296775 11/1989
JP 10-326336 12/1998
JP 2000-22971 1/2000

* cited by examiner

Primary Examiner—Thomas D. Lee
(74) Attorney, Agent, or Firm—Fitzpatrick, Cella, Harper & Scinto

(57) ABSTRACT

A scanner with an automatic density adjustment function executes image processing in which prescanning is performed and the background level is made white before the next scan starts. However, if an automatic density adjustment is applied when the same document is read as a color image and as a monochrome image, it is necessary to perform prescanning before the color image is read and prescanning before the monochrome image is read. Reading the image therefore takes time. Accordingly, if an automatic density adjustment based upon prescanning has been designated, prescanning is carried out and then a histogram is obtained for each of the components R, G and B and the background levels are calculated for color scanning and monochrome scanning. A table in a scanner image processor is set in accordance with a background peak value PeakBW for monochrome scanning. For color scanning, on the other hand, the table in the scanner image processor is set in accordance with a background peak value PeakCL for the color scan.

16 Claims, 32 Drawing Sheets

FIG. 18

| | |
|---|---|
| 8303 — | JOB NO. |
| 8304 — | DOCUMENT NO. |

8301

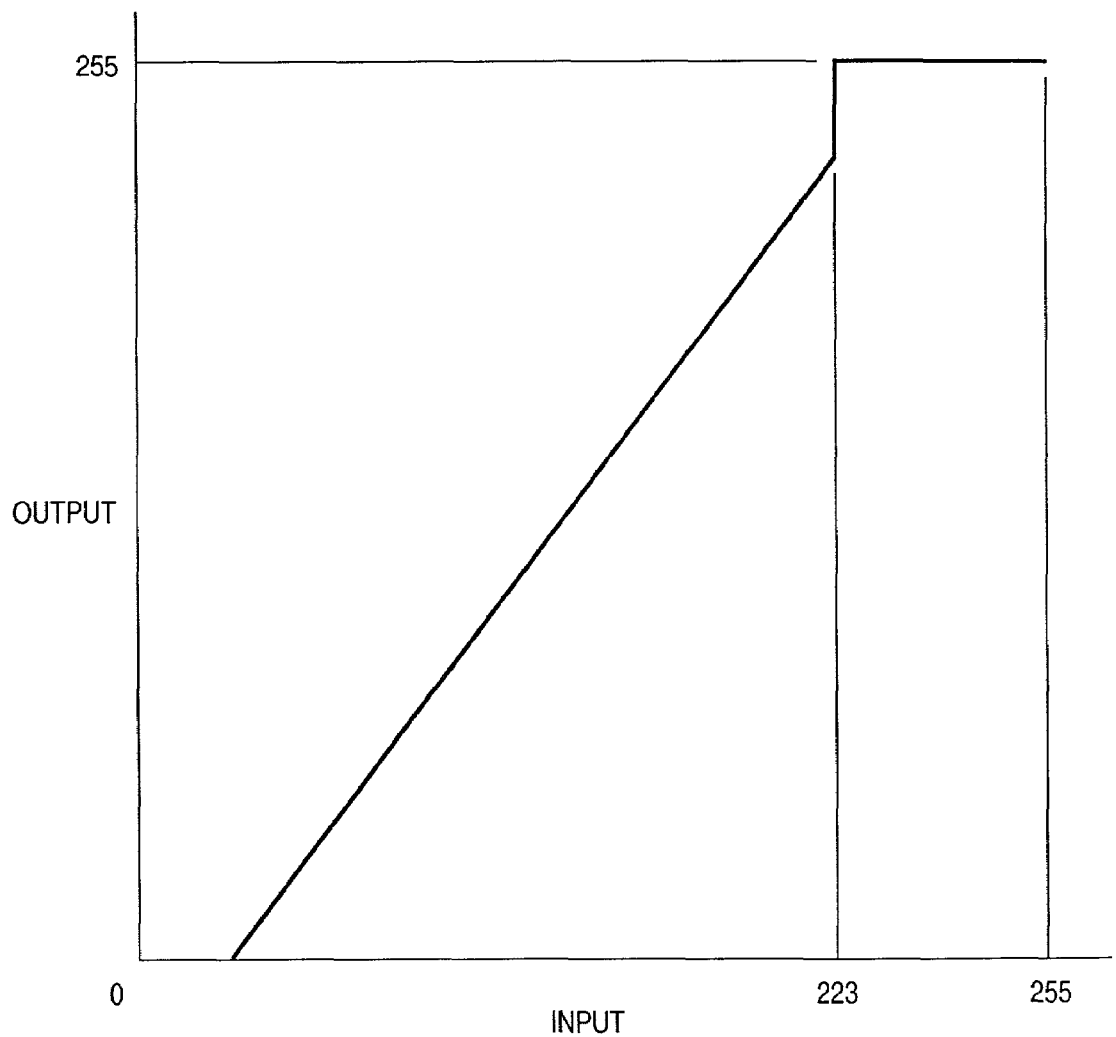
F I G. 30

IMAGE PROCESSING APPARATUS

FIELD OF THE INVENTION

This invention relates to an image processing apparatus and method and, more particularly, to an image processing apparatus and method for inputting a document image.

BACKGROUND OF THE INVENTION

Multifunction copiers and network scanners have appeared and these devices can be used to freely exchange images with computers via a network. Recently, devices have also been announced that support multiple network and communications protocols so that a single entered image can be broadcast to multiple destinations by using different protocols. However, there are also devices that are capable of exchanging only monochrome images depending on the communication protocol, as is the case with facsimile machines. In view of such instances, the same document is read as both a color image and a monochrome image and either the color or monochrome image is sent in accordance with the communication protocol.

A scanner with an automatic density adjustment function executes image processing in which prescanning is performed and the background level is made white before the next scan starts. The reading of an image after the prescan in such a scanner is limited to the reading of color or monochrome image. As a consequence, if an automatic density adjustment is applied when the same document is read as a color image and as a monochrome image, it is necessary to perform prescanning before the color image is read and prescanning before the monochrome image is read. Reading the image therefore takes time.

SUMMARY OF THE INVENTION

Accordingly, an object of the present invention is to provide an image processing apparatus and method in which processing can be executed in a short time when an automatic density correction is applied in reading the same document as a color image and as a monochrome image.

According to the present invention, the foregoing object is attained by providing an image processing apparatus for obtaining a color and/or monochrome image by scanning an original image. Such an image processing apparatus includes a prescanner for extracting background information for a color image and for a monochrome image from the original image using a scanner before the original image is scanned by the scanner, and a controller for setting image processing conditions of the scanner based upon the background information extracted.

According to another aspect of the present invention, the foregoing objects are attained by providing an image processing apparatus that includes a scanner for obtaining a color and/or monochrome image by scanning an original image; a prescanner for prescanning an original image, which is to be scanned, using the scanner; a generator for generating a histogram corresponding to an image signal level of the image that has been prescanned; and extractor for extracting background information for a color image and/or background information for a monochrome image from the histogram; and a controller for setting image processing conditions of the scanner based upon the background information extracted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 18 is a diagram illustrating table data which a scanning operation management unit accepts from a job manager;

FIGS. 26 to 31 are diagrams illustrating examples of gamma correction curves for luminance data.

DESCRIPTION OF THE PREFERRED EMBODIMENT

An image processing apparatus according to a preferred embodiment of the present invention will now be described with reference to the drawings.

[Hardware Configuration]

Figure 1:
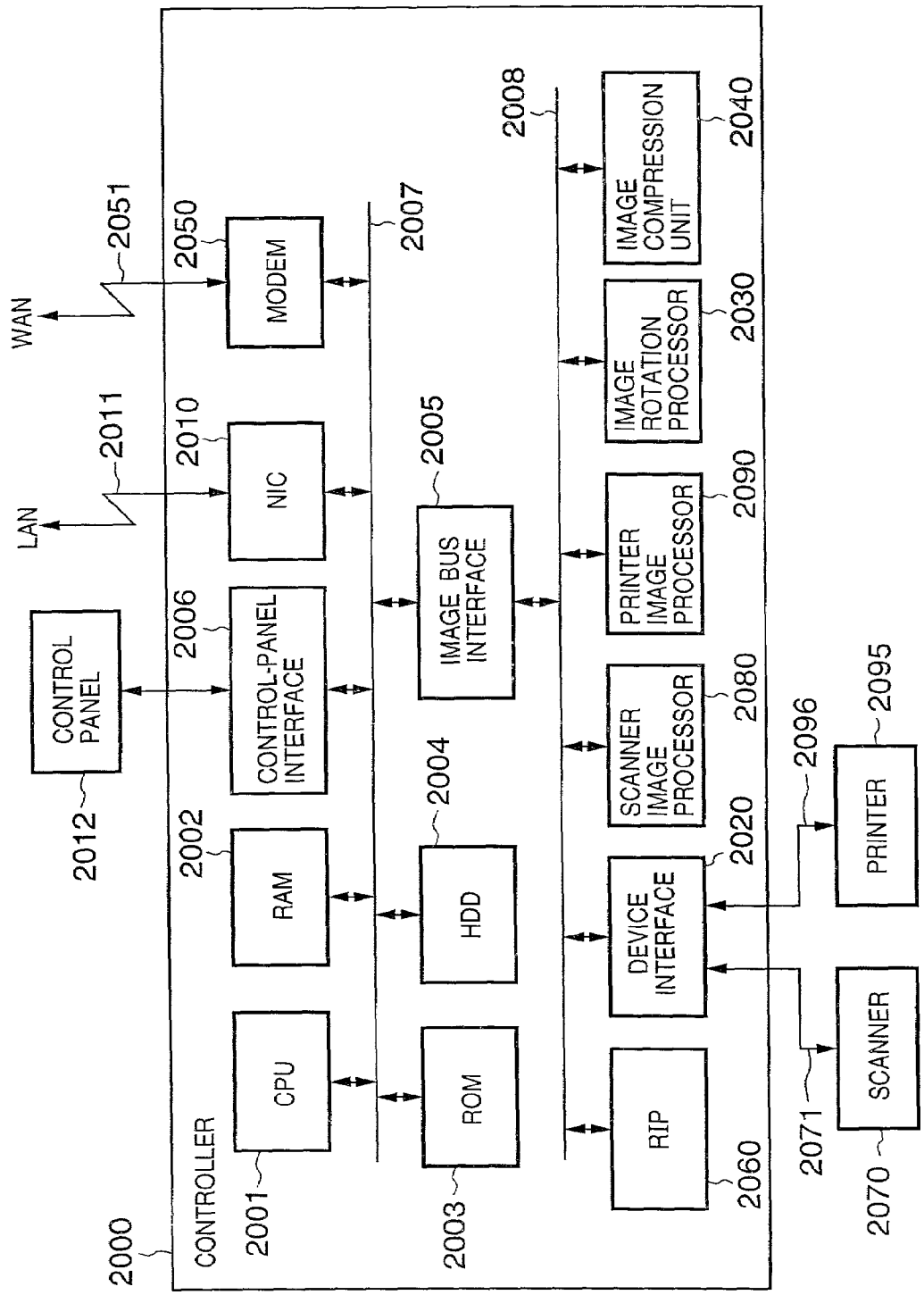
FIG. 1 is a block diagram illustrating the structure of an image processing apparatus according to a preferred embodiment of the present invention.

FIG. 1 is a block diagram illustrating the structure of the image processing apparatus according to this embodiment.

As shown in FIG. 1, the image processing apparatus includes a controller 2000 connected to a scanner 2070 serving as an image input device and to a printer 2095 serving as an image output device. By being connected to a local-area network (LAN) 2011 or to a wide-area network (WAN) 2051 such as a public network (PSTN), the controller 2000 is capable of inputting and outputting image information and device information. The controller 2000 has a CPU 2001 for controlling the overall apparatus utilizing a RAM 2002 as a working memory. The RAM 2002 is utilized also as an image memory for storing image data temporarily. The booting program of the apparatus has been stored in a booting ROM 2003.

A hard-disk drive (HDD) 2004 stores the system software and image data on a hard disk. A control-panel interface (I/F) 2006, which is for interfacing a control panel (user interface UI) 2012, outputs image data to be displayed on the control panel 2012 to the control panel 2012 and sends the CPU 2001 information that the user has entered from the control panel 2012. A modem 2050 is connected to the WAN 2051 and serves to input and output information. A network interface card (NIC) 2010 is connected to the LAN 2011 and is for inputting and outputting information.

The devices mentioned above are disposed on a system bus 2007. The system bus 2007 and an image bus 2008, which transfers image data at high speed, are connected by an image bus interface 2005. That is, the image bus interface 2005 is a bus bridge for converting data structure. The image bus 2008 is constituted by a serial bus such as a PCI (Peripheral Component Interconnect) bus or IEEE 1394. The devices set forth below are disposed on the image bus 2008.

A raster image processor (RIP) 2060 expands PDL (Page Description Language) code into a bitmap image. A device interface (I/F) 2020 is connected to the scanner 2070 and printer 2095 and subjects image data to a synchronous/asynchronous conversion. A scanner image processor 2080 subjects input image data to correction, manipulation and editing. A printer image processor 2090 subjects an image that is to be output to the printer 2095 to correction and resolution conversion processing, etc. An image rotation unit 2030 rotates the image. An image compression unit 2040 subjects multilevel image data to JPEG (Joint Photographic Experts Group) compression/expansion processing and subjects bi-level image data to JBIG (Joint Bi-level Image Group), MMR (Modified Modified Read) or MH (Modified Huffman) compression/expansion processing.

The arrangement of the image processing section described above is such that the system bus 2007 and image bus 2008 are made separate from each other taking expandability into account. In other words, the structure of an ordinary computer is employed. Further, employing a general-purpose interface for the image bus provides a degree of freedom that makes it possible to combine image processing operations at will and also affords expandability for future applications. In particular, the codec section (image compressing unit 2040) is connected to the side of the image bus for easy interchangeability in view of the possibility that various standards may be announced in the future.

[Image Input/Output]

Figure 2:
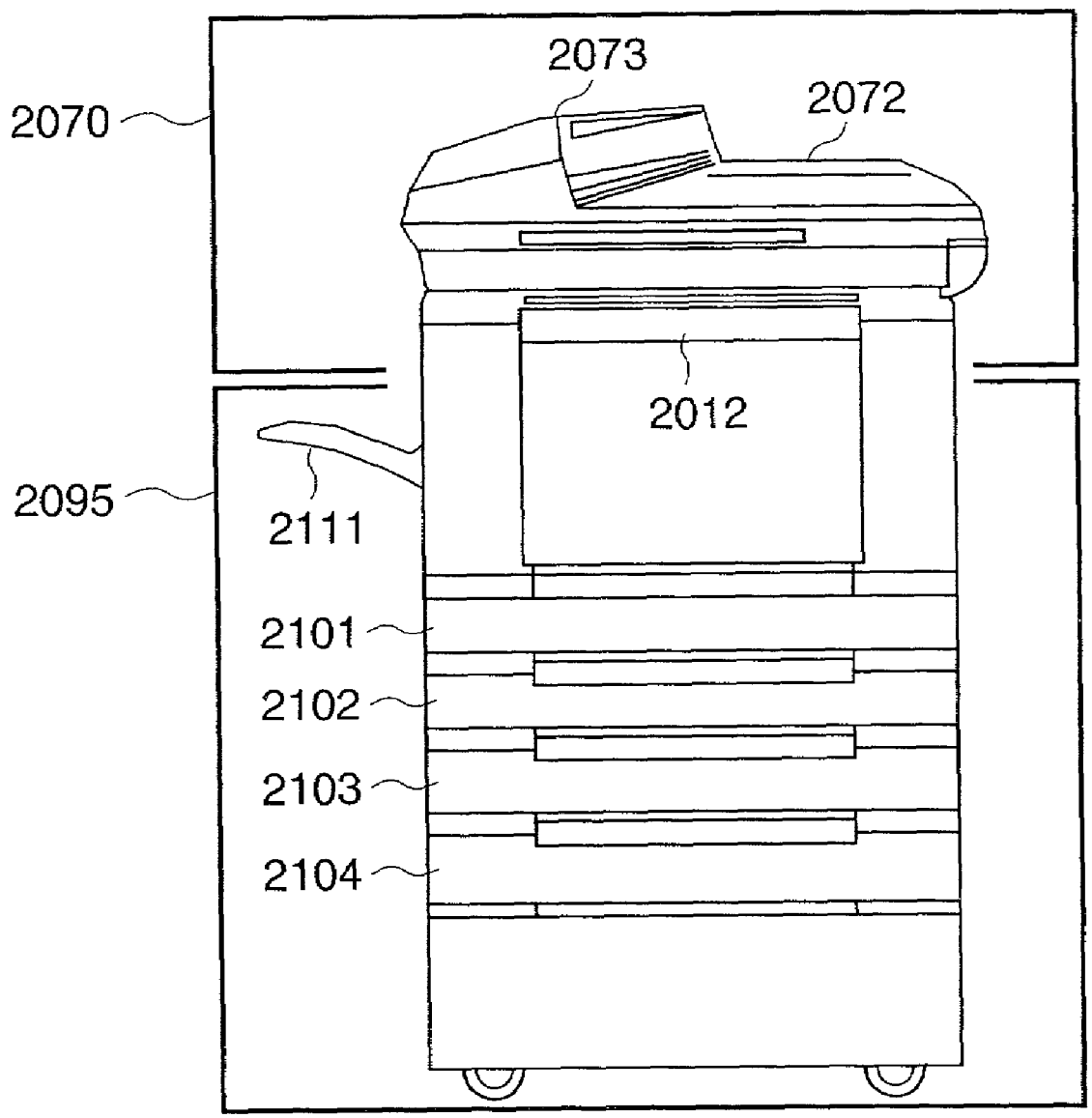
FIG. 2 is a diagram showing an image input/output device.

FIG. 2 is a diagram illustrating an image input/output device.

The scanner 2070, which is an image input device, illuminates a document and scans the document using a CCD line sensor to convert the scanned image to raster-image data 2071 (FIG. 1). The document is placed on a tray 2073 of a document feeder 2072, after which the start of reading is commanded by the control panel 2012. In response, the CPU 2001 applies a command to the scanner 2070 and the feeder 2072 feeds in the document one sheet at a time so that the document images are read.

The printer 2095, serving as an image output devices, prints an image, which corresponds to the raster-image data 2096, on printing paper. Any image forming technique may be used in the printer 2095. Examples are electrophotography, which employs a photosensitive drum or belt, and an ink-jet technique, which prints an image by jetting ink from an array of nozzles. The printing operation is started up in response to a command from the CPU 2001. The printer 2095 includes a plurality of supply bins, which make it possible to select printing paper of different sizes or orientations, and it includes cassettes 2101 to 2104 corresponding to these bins. A drop tray 2111 receives the printing paper on which printing has been completed.

[Control Panel]

Figure 3:
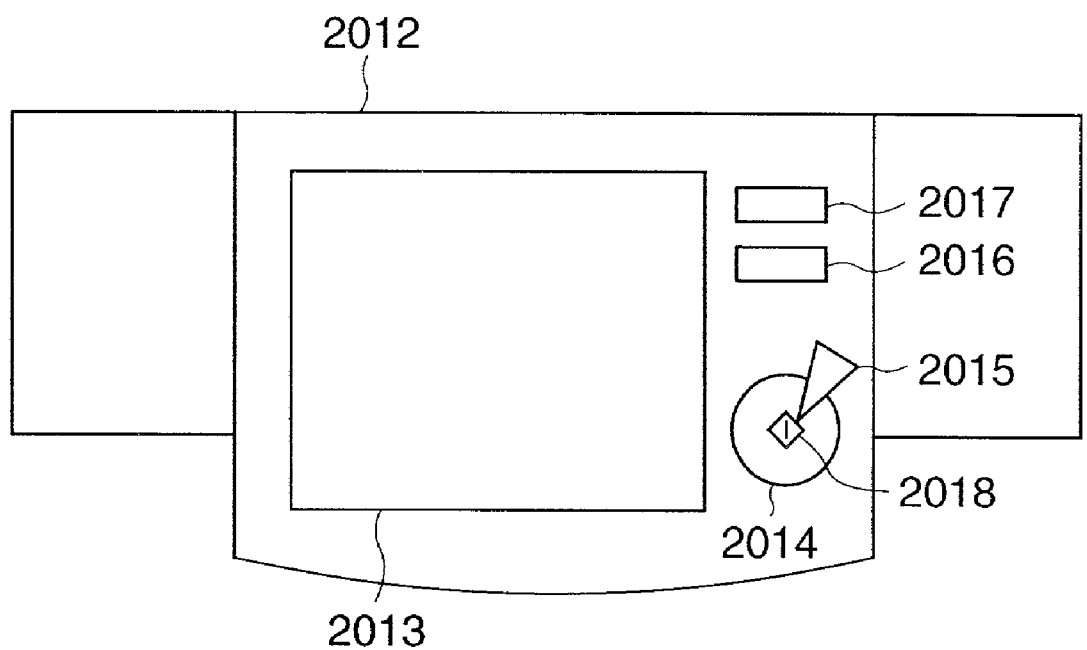
FIG. 3 is a diagram illustrating the arrangement of a control panel shown in FIG. 1.

FIG. 3 is a diagram showing the arrangement of the control panel 2012.

As shown in FIG. 3, an LCD display unit 2013 includes a touch-sensitive panel sheet affixed to an LCD (Liquid Crystal Display) 2013 and displays a screen for operating the apparatus. If a position corresponding to a displayed key is pressed, the position information is sent from the control panel 2012 to the CPU 2001. A start key 2014 is used to command the start of reading of a document image. Situated at the center of the start key 2014 is a two-color (green and red) LED 2018 the color of which when lit indicates whether the start key 2014 is operable or not. A stop key 2015 is for halting an operation that is currently in progress, such as the operation for reading a document image. An ID key 2016 is used when the user inputs a user ID. A reset key 2017 is used to initialize operating conditions, etc., by canceling operating conditions or the like that have been set by the control panel 2012.

[Scanner Image Processor]

Figure 4:
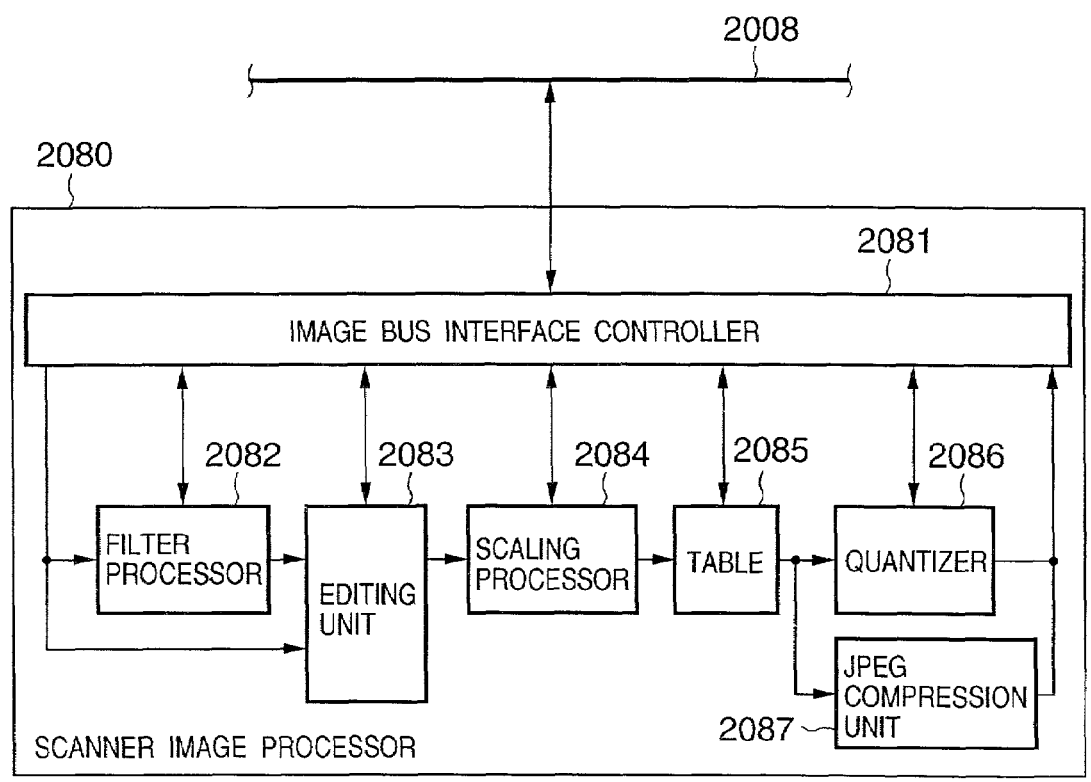
FIG. 4 is a block diagram illustrating the structure of a scanner image processing unit shown in FIG. 1.

FIG. 4 is a block diagram showing the structure of the scanner image processor 2080.

As shown in FIG. 4, an image bus interface controller 2081 is connected to the image bus 2008 and controls the bus access sequence thereof, controls each device within the scanner image processor 2080 and generates timing.

A filter processor 2082 is a spatial processor for executing a convolution operation. An editing unit 2083 recognizes a closed area, namely an area that has been enclosed by a marker pen, from the input image, and subjects the image in this closed area to image manipulation processing such as shadowing, hatching and negative-positive reversal. A scaling processor 2084 performs enlargement and reduction by executing interpolation in the main-scan direction of the raster image in a case where resolution of the read image is changed. With regard to scaling in the sub-scan direction, this is carried out by changing the speed at which the image reading line sensor is scanned.

A table 2085 is a conversion table for converting image data, which is luminance data, to density data. A quantizer 2086 quantizes a grayscale image data. The quantizer 2086 generates a bi-level image by pseudo-halftoning such as error-diffusion processing or screen processing, by way of example. A JPEG compression unit 2087 compresses the multilevel image data, which is output from the table 2085, in real time by well-known JPEG coding. The JPEG compression unit 2087 outputs the code of the image that has been JPEG-coded.

An image or code the processing of which by the scanner image processor 2080 has been completed is transmitted to the image bus 2008 again via the image bus interface controller 2081.

[Printer Image Processor]

Figure 5:
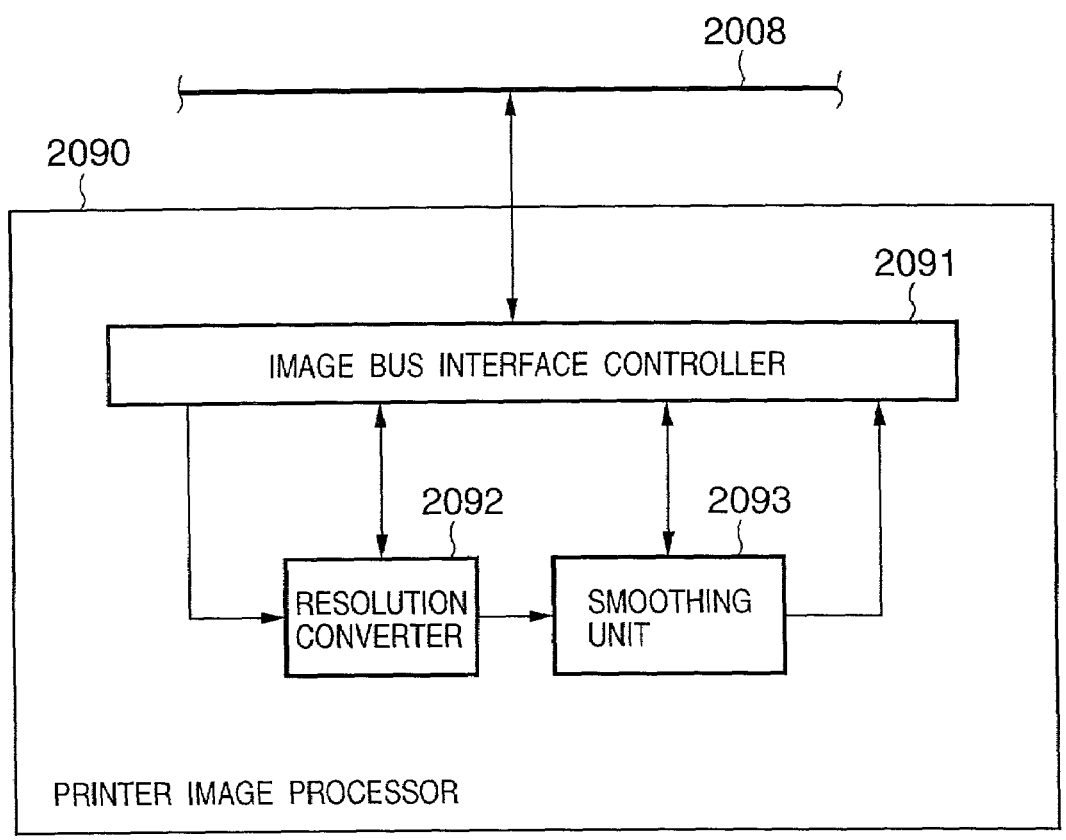
FIG. 5 is a block diagram illustrating the structure of a scanner image processing unit shown in FIG. 1.

FIG. 5 is a block diagram showing the structure of the printer image processor 2090.

As shown in FIG. 5, an image bus interface controller 2091 is connected to the image bus 2008 and controls the bus access sequence, controls each device within the printer image processor 2090 and generates timing.

A resolution converter 2092 converts the resolution of an image, which has been sent from the LAN 2011 or WAN 2051, to the resolution of the printer 2095. A smoothing processor 2093 smoothens jaggies possessed by the image whose resolution has been converted, i.e., smoothens image disturbance (jaggedness) that appears at black-white boundaries such as diagonal lines.

[Image Compression Unit]

Figure 6:
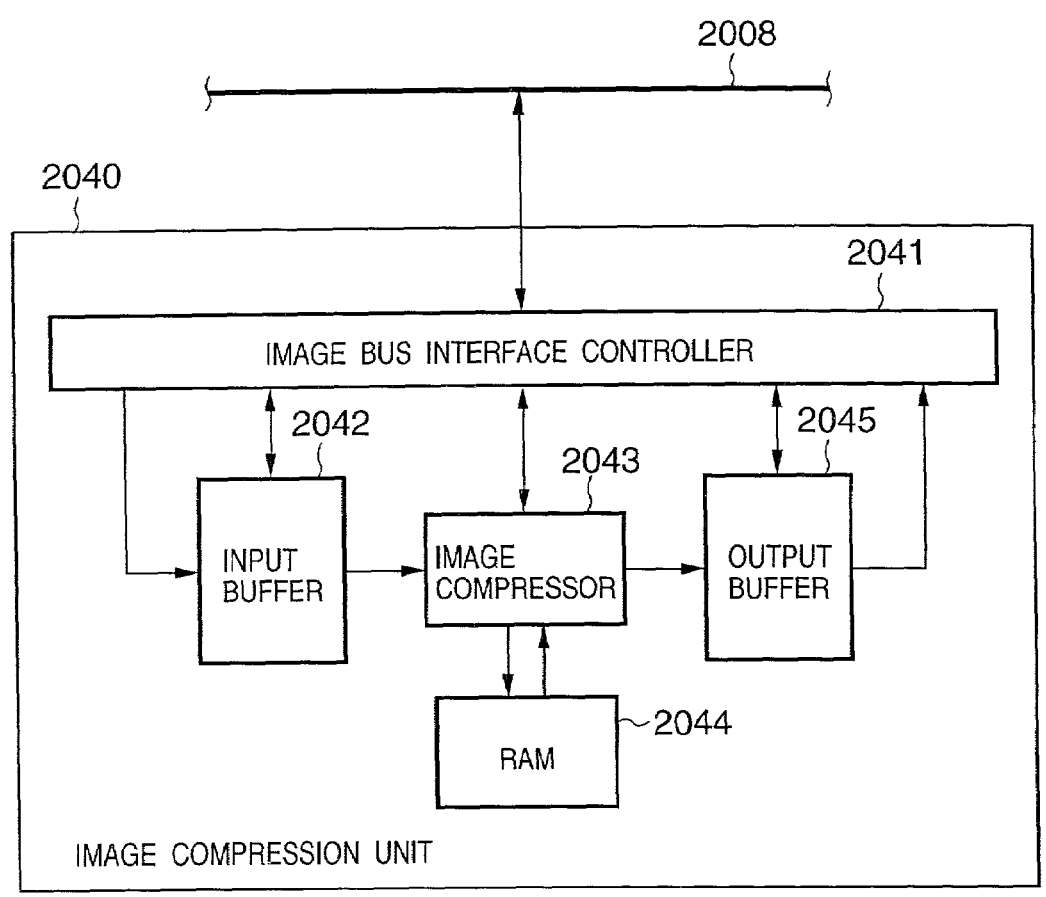
FIG. 6 is a block diagram illustrating the structure of an image compression unit shown in FIG. 1.

FIG. 6 is a block diagram showing the structure of the image compression unit 2040.

As shown in FIG. 6, an image bus interface controller 2041 is connected to the image bus 2008 and controls the bus access sequence, controls timing for performing an exchange of data with input/output buffers 2042 and 2045 and controls a mode setting with regard to an image compressor 2043. Processing executed by the image compression unit 2040 will now be described.

The image bus interface controller 2041 is configured for image compression control from the CPU 2001 via the image bus 2008. In accordance with this configuration, the image bus interface controller 2041 configures the image compressor/decompressor 2043 as necessary for image compression (e.g., compression by MMR, decompression by JBIG, etc.).

After the image bus interface controller 2041 has been configured as required, the CPU 2001 permits the image bus interface controller 2041 to transfer image data. In accordance with such permission, the image bus interface controller 2041 starts receiving image data from the RAM 2002 or from each device on the image bus 2008. The image data received is stored temporarily in the input buffer 2042 and the image is supplied to the image compressor/decompressor 2043 at a prescribed speed in conformity with the image data requirement of the image compressor/decompressor 2043. More specifically, the input buffer 2042 determines whether the image data can be transferred between the image bus interface controller 2041 and the image compressor 2043. In a case where receipt of image data via the image bus 2008 and the supply of image data to the image compressor 2043 are not possible, the input buffer 2042 exercises control in such a manner that data is not transferred. This control is referred to as "handshaking" below.

The image compressor/decompressor 2043 stores the supplied image data in the RAM 2044 temporarily. The reason for this is that several lines of image data are required by the compression method when image compression (or expansion) is carried out. For example, the compression of the first line of an image cannot be carried out unless several lines of image data that follow the first line are available.

The image data that has undergone compression (or expansion) is sent to the output buffer 2045 immediately. Handshaking between the image bus interface controller 2041 and the image compressor 2043 takes place in the output buffer 2045, which then supplies the compressed (or expanded) image data to the image bus interface controller 2041. The latter transfers this transferred and compressed (or expanded) image data to the RAM 2002 or to each device on the image bus 2008.

This series of processes is repeated until there are no longer any processing requests from the CPU 2001, i.e., until the processing of the required number of pages has ended, or until there is a halt request from the image compression unit 2048 in response to the occurrence of an error at the time of compression or expansion.

[Image Rotation Unit]

Figure 7:
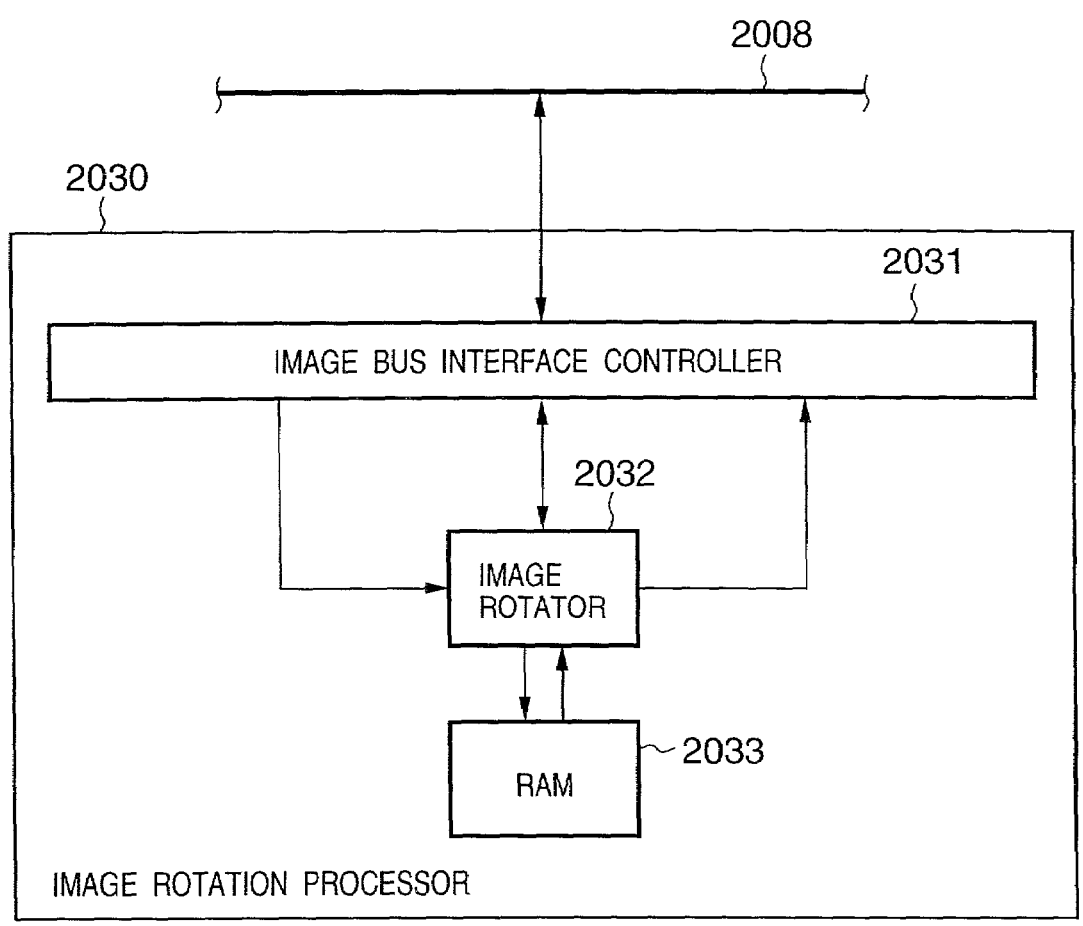
FIG. 7 is a block diagram illustrating the structure of an image compression unit shown in FIG. 1.

FIG. 7 is a block diagram showing the structure of the image rotation unit 2030.

As shown in FIG. 7, an image bus interface controller 2031 is connected to the image bus 2008 and controls the bus access sequence, controls the mode, etc., to which an image rotator 2032 is set, and controls timing for the transfer of image data to the image rotator 2032. The processing executed by the image rotator 2032 will now be described.

The image bus interface controller 2031 is configured for image rotation control from the CPU 2001 via the image bus 2008. In accordance with this setup, the image bus interface controller 2031 subjects the image rotator 2032 to settings necessary for image rotation, e.g., image size, direction and angle of rotation.

After the image bus interface controller 2031 has been configured as necessary, the CPU 2001 permits the image bus interface controller 2031 to transfer the image data. In accordance with such permission, the image bus interface controller 2031 starts receiving image data from the RAM 2002 or from each device on the image bus 2008.

Figure 8:
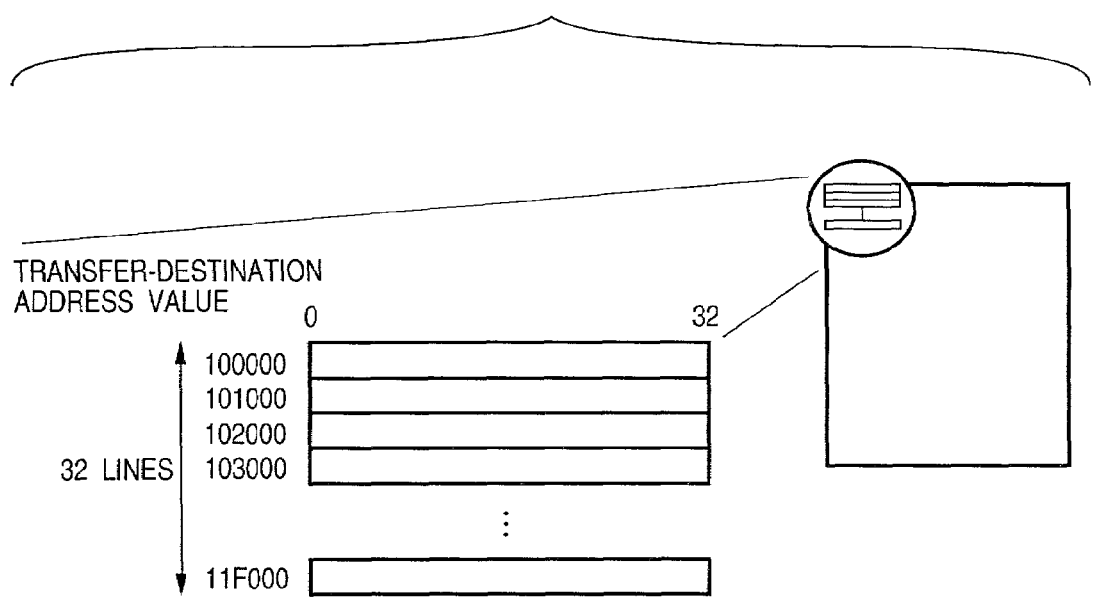
FIG. 8 is a diagram useful in describing data transfer by non-contiguous addressing image data.
Figure 9:
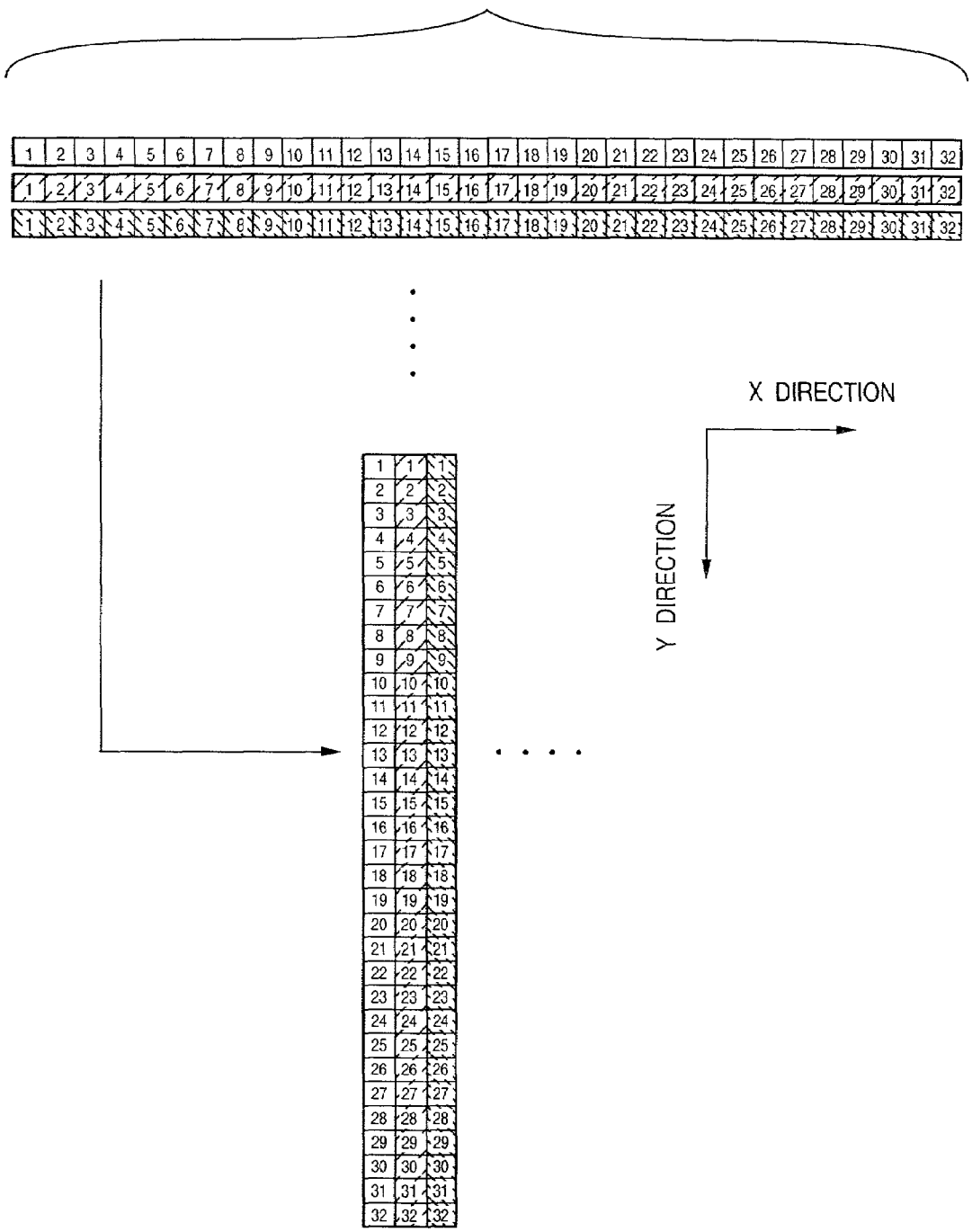
FIG. 9 is a diagram illustrating the manner in which transferred image data is written to a memory.

In the description that follows, it is assumed that the size of the image to be rotated is a 32×32 dot bi-level image and that the transfer of the image data on the image bus 2008 is performed in units of 32 bits. Accordingly, in order to obtain a 32×32 dot image, it is necessary that the transfer of image data in units of 32 bits be performed 32 times. In addition, it is required that the image data be transferred from non-contiguous addresses (see FIG. 8). The image data transferred by non-contiguous addressing is written to the RAM 2033 in such a manner that it will be rotated through the desired angle when it is read out. For example, if the image is to be rotated 90° in the counter-clockwise direction, the 32-bit image data received is written to the RAM 2033 as shown in FIG. 9. At read-out from the RAM 2033, the image data is read out in the X direction shown in FIG. 9, whereby the desired rotation of the image is achieved.

Upon completion of rotation of the image, namely the writing of the image data to the RAM 2033, the image rotator 2032 reads the image data out of the RAM 2033 through the above-described read-out method and supplies the image data to the image bus interface controller 2031.

The image bus interface controller 2031 that has been supplied with the image data of the rotated image transfers the data to the RAM 2002 or to the devices on the image bus 2008 through contiguous addressing. This series of processes is repeated until there are no longer any processing requests from the CPU 2001, i.e., until processing of the required number of pages ends.

[Device Interface]

Figure 10:
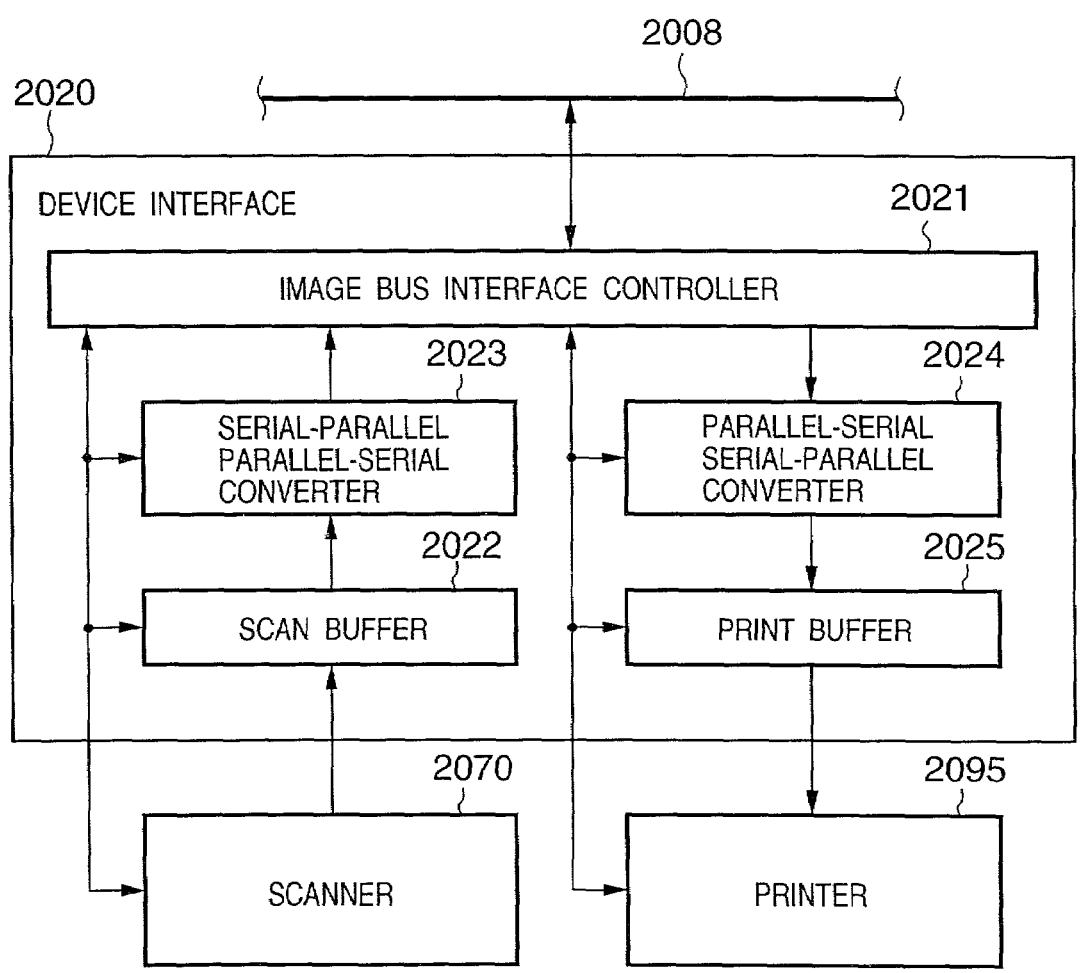
FIG. 10 is a block diagram illustrating the structure of a device interface shown in FIG. 1.

FIG. 10 is a block diagram showing the structure of the device interface 2020.

As shown in FIG. 10, an image bus interface controller 2021 is connected to the image bus 2008 and controls the bus access sequence, controls each device in the device interface 2020 and generates timing. Furthermore, the image bus interface controller 2021 generates control signals applied to the external scanner 2070 and printer 2095.

A scan buffer 2022 temporarily stores the image data sent from the scanner 2070 and outputs image data in sync with the timing signal sent from the image bus interface controller 2021. A serial/parallel parallel/serial converter 2023 places the image data, which enters from the scan buffer 2022, in a predetermined order or disassembles this image data, whereby there is achieved a conversion to a data width of image data capable of being transferred over the image bus 2008.

A parallel/serial serial/parallel converter 2024 decomposes, or places in a predetermined order, image data that has been transferred via the image bus 2008, whereby there is achieved conversion to a data width of image data capable of being stored in a print buffer 2025. The print buffer 2025 temporarily stores entered image data and outputs the image data in sync with the printing operation of the printer 2095.

Processing at the time of image scanning will now be described.

Image data output from the scanner 2070 is stored in the scan buffer 2022 in sync with a timing signal output from the scanner 2070. In case where the image bus 2008 is a PCI bus, 32 bits of image data is sent from the scan buffer 2022 to the serial/parallel parallel/serial converter 2023 in first-in first-out fashion at the timing at which the 32 bits of image data was stored in the scan buffer 2022. The data is thereby converted to 32-bit image data. In a case where the image bus 2008 is in compliance with IEEE 1394, the image data in the scan buffer 2022 is sent from this buffer to the serial/parallel parallel/serial converter 2023 in first-in first-out fashion so that the data is converted to serial data. The 32-bit image data or the serial data output from the serial/parallel parallel/serial converter 2023 is transferred via the image bus interface controller 2021 and image bus 2008.

Processing at the time of image printing will now be described.

In a case where the image bus 2008 is a PCI bus, 32-bit image data received by the image bus interface controller via the image bus 2008 is sent to the parallel/serial serial/parallel converter 2024, decomposed into image data corresponding to the number of bits of data input to the printer 2095 and then stored in the print buffer 2025. In a case where the image bus 2008 is in compliance with IEEE 1394, serial image data received by the image bus interface controller 2021 via the image bus 2008 is sent to the parallel/serial serial/parallel converter 2024, arrayed into image data corresponding to the number of bits input to the printer 2095 and then stored in the print buffer 2025. Then, in sync with a timing signal issued by the printer 2095, the image data in the buffer is sent to the printer 2095 in first-in first-out fashion.

[System Configuration]

Figure 11:
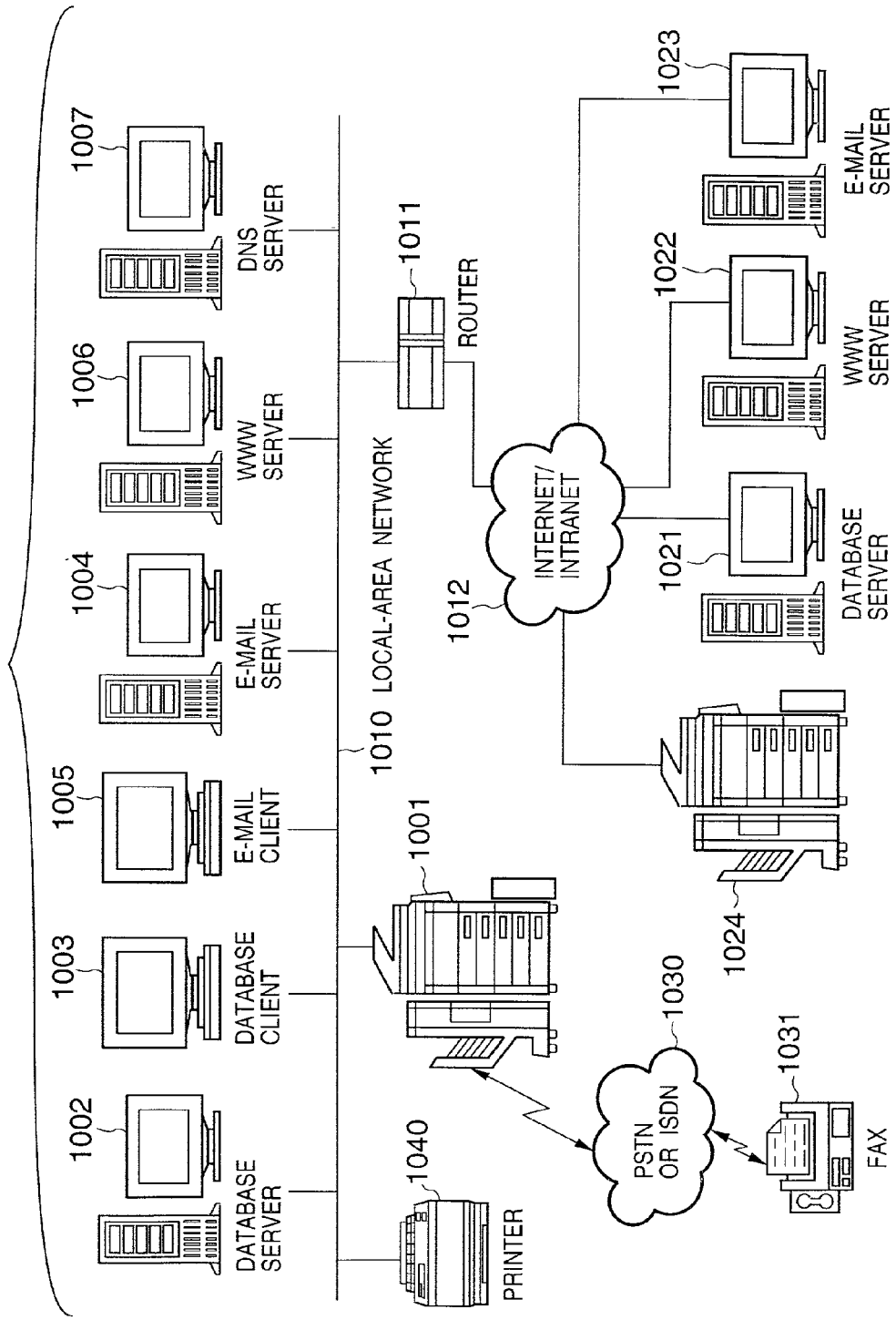
FIG. 11 is a diagram illustrating the overall configuration of a network system in which the image processing apparatus of this embodiment is connected.

FIG. 11 is a diagram illustrating the overall configuration of a network system in which the image processing apparatus of this embodiment is connected.

In FIG. 11, an image processing apparatus 1001 according to this embodiment comprises a scanner, printer and controller, as set forth above. An image read by the scanner can be sent to a LAN 1010, and an image received from the LAN 1010 can be printed out. Further, an image read by the scanner can be transmitted to a facsimile machine 1031 via a PSTN or ISDN 1030, and an image received from the PSTN or ISDN 1030 can be printed out.

A database server 1002 registers and manages bi-level and multilevel images, which have been read in by the combined apparatus 1001, in a database. A database client 1003 of the database server 1002 is capable of browsing/retrieving images that have been registered in the database 1002.

An electronic mail server 1004 sends and receives e-mail in accordance with SMTP (Simple Mail Transfer Protocol) and POP (Post Office Protocol). An electronic mail client 1005 is capable of browsing mail that has been accepted by the e-mail server 1004 and of transmitting e-mail. The electronic mail client 1005 attaches a bi-level image and/or a multilevel image, which has been read by the image processing apparatus 1001 or registered in the database server 1002, to e-mail that is transmitted.

A WWW (World-Wide Web) server 1006, which supplies the LAN 1010, etc., with HTML (HyperText Markup Language) text, is capable of printing out HTML text provided by the image processing apparatus 1001. A DNS server 1007 provides a DNS (Domain Name Service).

A router 1007 connects the LAN 1010 to the Internet and/or intranet 1012. Devices similar to the database server 1002, WWW server 1006, electronic mail server 1004 and image processing apparatus 1001 are connected to the Internet and/or intranet 1012 as devices 1021, 1022, 1023 and 1024, respectively.

Further, a printer 1040 is connected to the LAN 1010, prints out images read by the image processing apparatus 1001 and processes print requests from various servers and clients.

[Software Structure]

Figure 12:
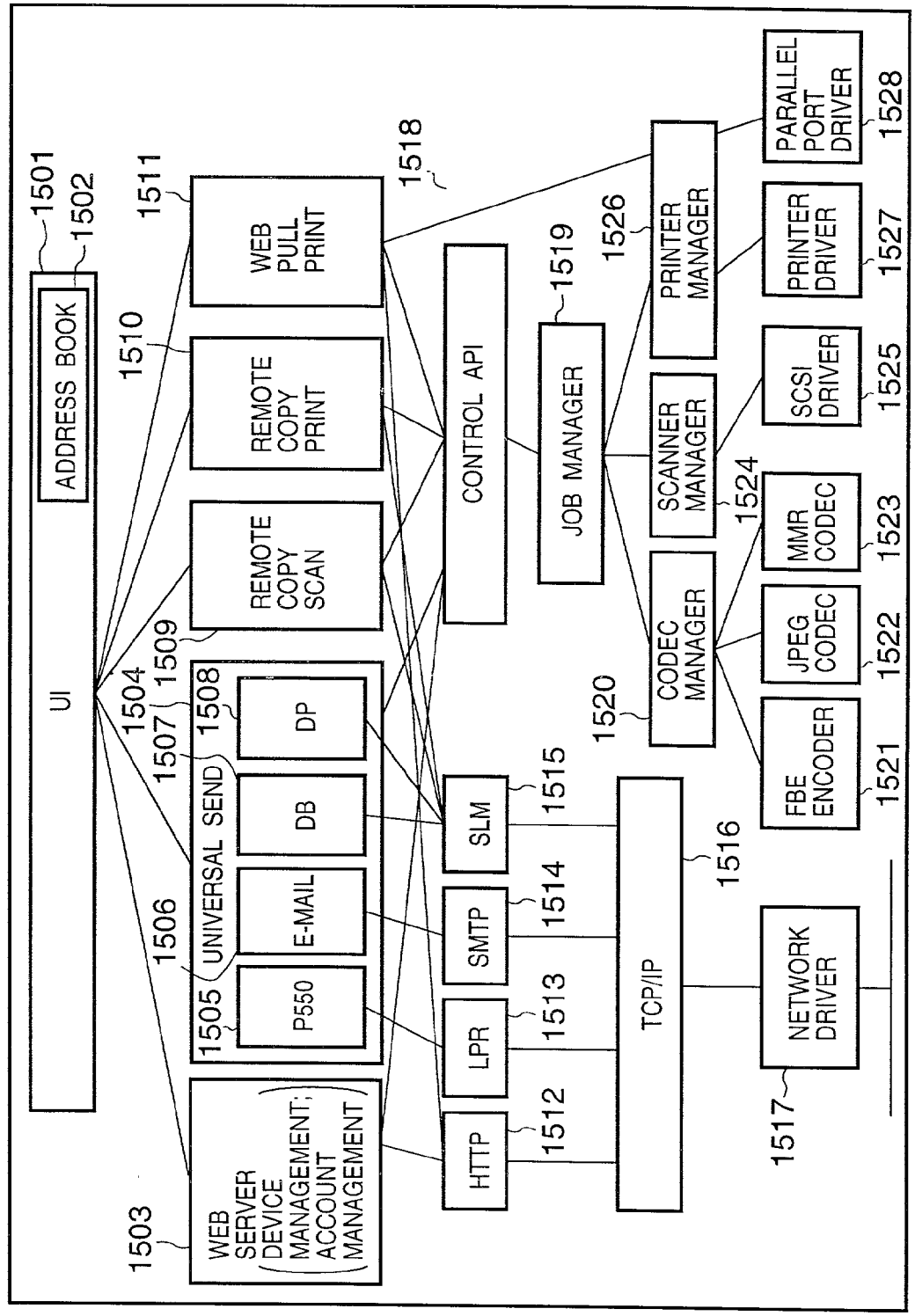
FIG. 12 is a block diagram illustrating the software structure of the image processing apparatus.

FIG. 12 is a block diagram illustrating the software structure of the image processing apparatus 1001.

A software module (referred to simply as a "module" below) UI 1501, which controls the user interface, acts as the intermediary with the image processing apparatus 1001 when the apparatus is operated in various ways and configured. In accordance with operation of the control panel 1012 by the user, the UI 1501 transfers input information to various modules, described later, requests processing and configures data.

An address book module 1502 is a database module for managing the addressee and communication destination of data. The registered content of the address book 1502 can be added to, deleted from and acquired by an operation performed at the UI 1501, and the address book is used as means for providing each module (described below) with data addressee and communication-destination information in response to an operation performed by the user.

A Web-server module 1503 is used to give notification of management information of the image processing apparatus 1001 in response to a request from an external Web client. The management information is acquired via a control API 1518 (described later) and communicated to the Web client via an HTTP 1512, TCP/IP 1516 and network driver 1517, described later.

A universal-send module 1504 controls the distribution of data. Data that has been designated by the user using the UI 1501 is distributed by the module 1504 to a communication (output) destination designated by the user is similar fashion. In a case where the generation of distributed data using the scanner has been designated by the user, the scanner is operated via a control API 1518 (described later) to generate the data.

A module P550 (1505) is executed when the printer is designated within the universal-send module 1504 as the output destination. A e-mail module 1506 is executed when an e-mail address is designated within the universal-send module 1504 as the communication destination. A database (DB) module 1507 is executed when a database is designated within the universal-send module 1504 as the output destination. A DP module 1508 is executed when an image processing apparatus (multifunction apparatus) similar to the image processing apparatus 1001 is designated within the universal-send module 1504 as the output destination.

A remote copy scan module 1509 uses the scanner of the image processing apparatus 1001 to execute processing equivalent to the copy function that can be implemented by the image processing apparatus 1001 singly, with another multifunction apparatus connected by a network or the like serving as the output destination. A remote copy print module 1510 uses the printer of the image processing apparatus 1001 to execute processing equivalent to the copy function that can be implemented by the image processing apparatus 1001 singly, with another multifunction apparatus connected by a network or the like serving as the input source. A Web-pull print module 1511 reads out and prints various website information, i.e., so-called "Web pages", from the Internet or intranet.

An HTTP module 1512 is used when the image processing apparatus 1001 communicates by HTTP (HyperText Transfer Protocol). This module provides the Web-server module 1503 and Web-pull print module 1511 with communication by means of the TCP/IP module 1516, described below. An LPR module 1513 provides the printer module P550 (1505) within the universal-send module 1504 with communication by means of the TCP/IP module 1516. An SMTP module 1514 provides the e-mail module 1506 within the universal-send module 1504 with communication by means of the TCP/IP module 1516. A salutation manager (SLM) module 1515 provides the database modules 1507 and 1508 within the universal-send module 1504 and the remote copy scan module 1509 and remote copy print module 1510 with communication by means of the TCP/IP module 1516. Furthermore, the SLM is one type of network protocol that includes device control information referred to as a salutation manager or SmartLink manager.

The TCP/IP module 1516, which supports communication in accordance with TCP/IP (Transfer Control Protocol/Internet Protocol), provides the above-mentioned modules with network communication by the network driver 1517. The latter is for controlling components physically connected to the network.

The control API 1518 provides an API (Application Interface) for interfacing modules upstream of the universal-send module 1504 with modules downstream of a job manager module 1519. This module reduces the dependency between the upstream and downstream modules and enhances the versatility of these modules. The job manager module 1519 interprets processes specified by the various modules via the control API 1518 and applies commands to modules set forth below. The job manager module 1519 further implements unified management of the hardware processes executed within the image processing apparatus 1001.

The scanner manager module 1524 manages and controls scan processing designated by the job manager module 1519. An SCSI scanner driver 1525 is for implementing communication between the scanner manager module 1524 and a scanner unit to which the image processing apparatus 1001 is internally connected. It should be noted that the scanner interface is not limited to an SCSI (Small Computer Standard Interface). Other interfaces which may be used are a parallel interface such as a GPIB, a serial bus interface such as an IEEE 1394 or USB (Universal Serial Bus), or a serial interface such as an RS232C or RS422.

The print manager module 1526 manages and controls print processing designated by the job manager module 1519. A printer driver 1527 is for allowing communication to be performed between the print manager module 1526 and a printer connected internally to the image processing apparatus 1001. As in the case of the scanner, the printer interface may be a parallel interface such as an SCSI, GPIB or Centronics interface, a serial bus interface such as an IEEE 1394 or USB, or a serial interface such as an RS232C or RS422.

A codec manager module 1520 manages and controls various types of data compression and expansion among the processes specified by the job manager module 1519. An FBE (Fast Boundary Encoding) encoder 1521 compresses, in accordance with an FBE format, data read by scanning processing executed by the job manager module 1519 and a scanner manager module 1524. A JPEG codec module 1522 performs JPEG compression of read data and JPEG expansion of print data in the scan processing executed by the job manager module 1519 and scanner manager module 1524 and print processing executed by a print manager module 1526.

An MMR codec module 1523 performs MMR compression of read data and MMR expansion of print data in the scan processing executed by the job manager module 1519 and scanner manager module 1524 and print processing executed by a print manager module 1526.

A parallel-port driver 1528 provides the interface when the Web-pull print module 1511 outputs data to an external output device via a parallel port.

[Applications]

Figure 13:
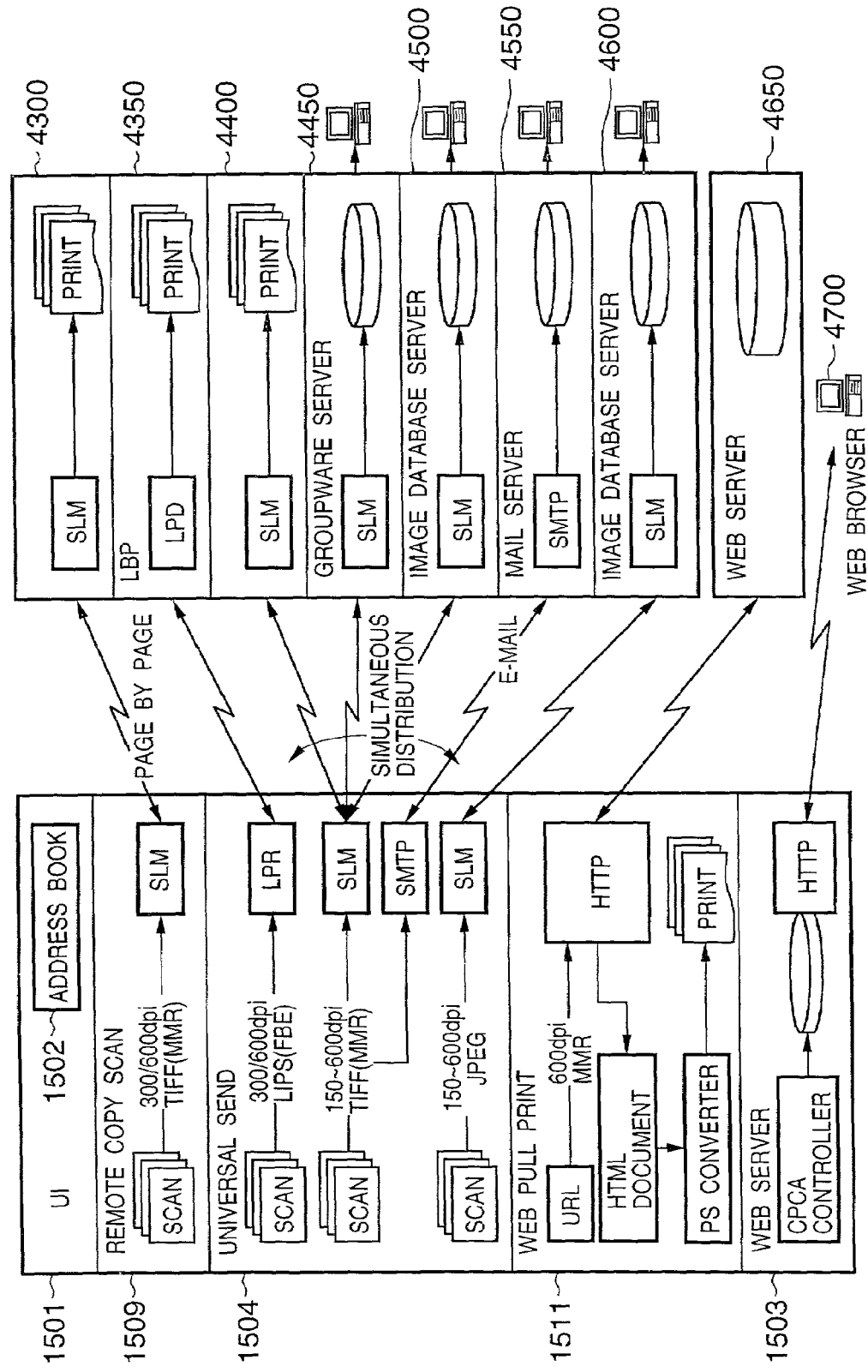
FIG. 13 is a block diagram illustrating the configuration of a network useful in describing the operation of an application.

The operation of applications incorporated in the image processing apparatus 1001 according to this embodiment will now be described. FIG. 13 is a block diagram illustrating a network configuration useful in describing the operation of applications.

A multifunction device on the receiving side (print side) of a remote copy is indicated at 4300 in FIG. 13. Other blocks in FIG. 13 include a printer 4350 such as a laser printer (LBP) for receiving and printing an image broadcast from the universal-send module 1504; a device 4400 on the receiving side (print side) of remote printing; a GroupWare server 4450 for receiving and storing a broadcast image; image database servers for receiving and storing broadcast bi-level images; a mail server 4550 for receiving a broadcast image; and a Web browser for accessing the Web server.

[User Interface Application]

The details of the UI module 1501 are as described above. The address book 1502 will be described here.

The address book 1502 is stored in a non-volatile storage device, e.g., a non-volatile memory or hard disk, etc., within the image processing apparatus 1001. The features of the devices connected to the network are written in the address book. The following items of information are included in the address book:

the formal names and aliases of the devices;

the network addresses of the devices;

the network protocols capable of being executed by the devices;

the document formats capable of being implemented by the devices;

the types of compression capable of being executed by the devices;

the image resolutions of the devices;

the paper sizes capable of being supplied and information concerning the paper supply bins in case of a printer; and the names of folders capable of storing documents in case of a server.

The applications described below are such that the features of broadcast destinations are identified based upon information that has been written in the address book 1502. Further, the address book 1502 is capable of being edited and makes it possible to download and use what has been stored in the server of the network or to refer to this information directly.

[Remote Copy Application]

In accordance with resolution information representing resolution achievable by the device specified at the distribution destination recognizable by the address book 1502, the remote copy scan application 1509 compresses by MMR compression the bi-level image read by the scanner, converts the format to TIFF (Tagged Image File Format) and then transmits the image to the multifunction device 4300, etc., on the network.

[Broadcast Distribution Application]

The broadcast distribution application based upon the universal-send module 1504 differs from the remote copy application in that this application makes it possible to transmit an image to a plurality of distribution destinations by a single image scan. In addition, distribution destinations are not limited to image output devices such as printers; information can be distributed directly to servers and the like as well.

Operation relating to each distribution destination will now be described.

If it is determined from the address book 1502 that the network printer protocol of the device which is the distribution destination is LPD (Line Printer Daemon) and that the well-known Page Description Language (PDL) is capable of being processed, then, in similar fashion, an image is read in accordance with the image resolution of the destination device recognized from the address book 1502, the image itself is compressed by an FBE encoder 1521, the compressed image is subjected to a PDL conversion and the result is transmitted by LPR module 1513 to the printer 4350 at the broadcast destination.

If the device which is the destination is capable of communicating in accordance with SLM and is a server, the server address and the designation of the folder within the server are recognized from the address book 1502. Then, in a manner similar to that of the remote copy application, the bi-level image, which has been read by the scanner, can be compressed using MMR compression, the format of the compressed image can be converted to TIFF and the image can be stored in a specific folder of the network server 4550 or 4500 via the SLM 1515. If the server at the broadcast destination is determined to be capable of processing a multilevel image that has undergone JPEG compression, then the image that has been read by the scanner can be subjected to JPEG compression and to a JFIF conversion and the resulting image can be stored in a specific folder of network server 4600 or the like via the SLM 1515.

If the device which is the destination of distribution is an e-mail server, then the mail address that has been written in the address book 4051 is recognized, the bi-level image, which has been read by the scanner, is compressed using MMR compression, the format is converted to TIFF and the resulting image is transmitted to the e-mail server 4550 using the SMTP 1514. Subsequent distribution is executed by the mail server.

[Web-pull Print Application]

The Web-pull print application implemented by the Web-pull print module 1511 prints website information such as that of a Web server 4650.

[Web Server Application]

The Web server application implemented by the Web-server module 1503 supplies website information in HTML or the like to a Web browser 4700, etc., by the HTTP module 1512.

[Control Screen]

The control screen displayed on the LCD of the control panel 2012 will now be described in simple terms.

Figure 14:
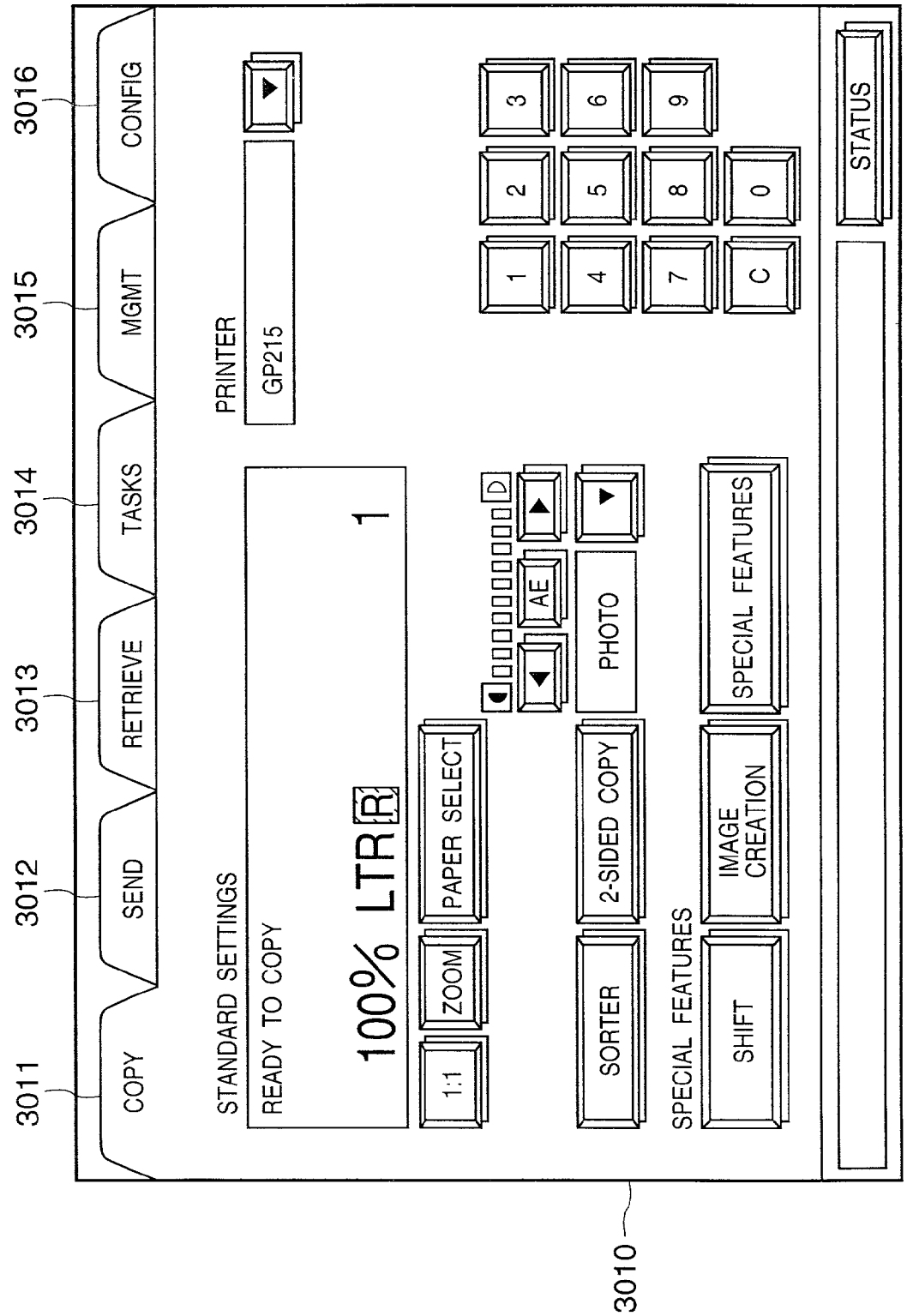
FIG. 14 is a diagram illustrating an example of a control screen displayed on an LCD of the control panel shown in FIG. 1.

Functions provided by the image processing apparatus 1001 are classified into six categories, namely COPY, SEND, RETRIEVE, TASKS, MANAGEMENT and CONFIGURATION. These functions correspond to six main tabs COPY 3011, SEND 3012, RETRIEVE 3013, TASKS 3014, MGMT 3015, CONFIG 3016 displayed at the top of the control screen 3010 shown in FIG. 14. The control screen 3010 is changed over to the screen of each category by selecting the corresponding main tab. In a case where changeover to another category is not allowed, the fact that the category is not selectable is indicated by changing the color in which the main tab is displayed.

COPY includes a function for carrying out document copying using the scanner and printer possessed by the local device, and a function (remote copy) for copying documents using the scanner possessed by the local device and a printer connected on the network.

SEND is a function for transmitting the image of a document, which has been placed in the scanner possessed by the local device, to electronic mail, a remote printer and a facsimile machine, and for subjecting the image to FTP (File Transfer Protocol) transfer and for transferring the image to a database. A plurality of destinations can be specified.

RETRIEVE is a function for acquiring an external document image and printing the document using the printer of the local device. The World-Wide Web, electronic mail, FTP and facsimile can be used as means for acquiring documents.

TASKS is a function which generates and manages tasks for performing retrieval periodically by automatically processing document images sent from the outside, such as from a facsimile machine or from the Internet.

MANAGEMENT is for managing information such as jobs, address books, bookmarks, documents and accounts information.

CONFIGURATION is for configuring the local device (network configuration, clock settings, etc.).

[Device Information Service]

Figure 15:
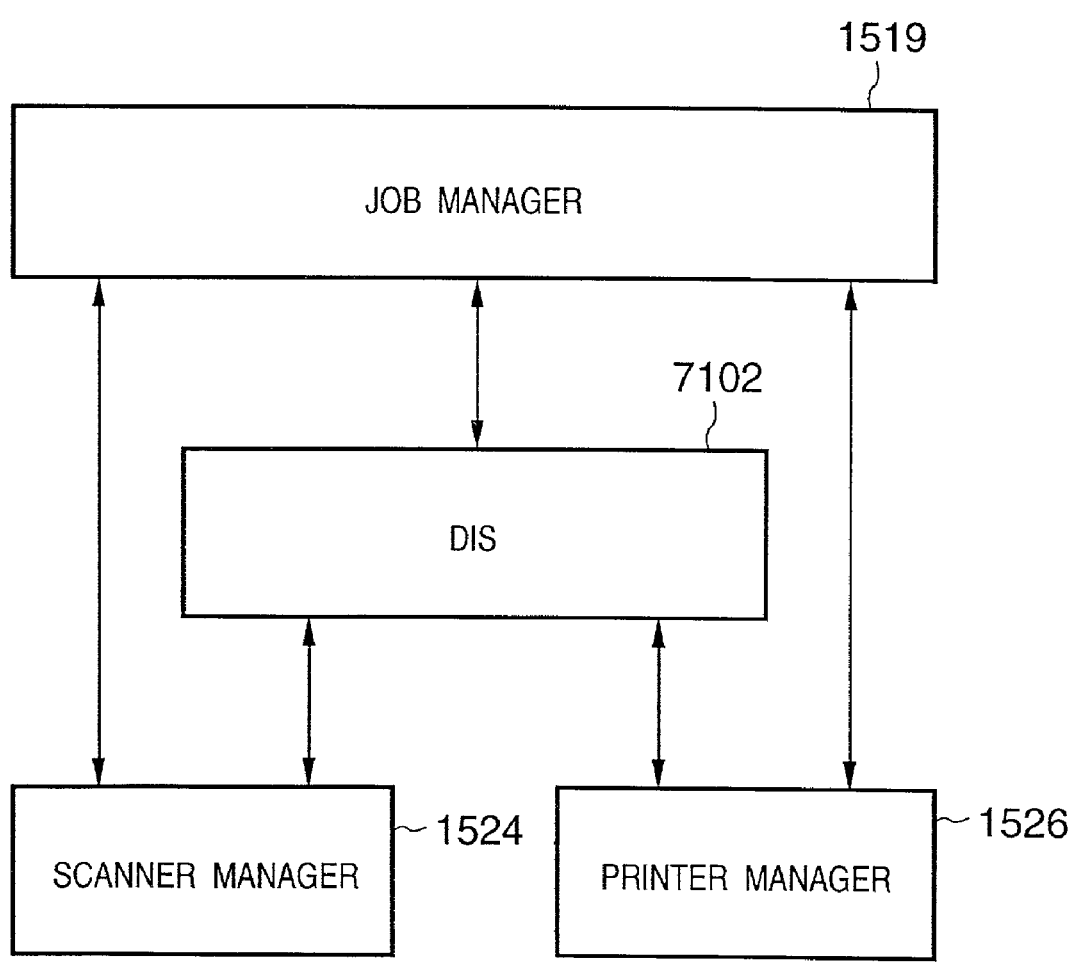
FIG. 15 is a diagram illustrating an information exchange among a job manager, a scanner manager and a print manager.

Set values regarding jobs, the functions of devices (scanners, printers, etc.), status and billing information, etc., is stored as a database within the controller of the image processing apparatus 1001 in compliance with the control API 1518, and the interface with this database is defined as a Device Information Service (DIS). FIG. 15 illustrates the exchange of information among a DIS 7102, the job manager 1519, the scan manager 1524 and the print manager 1526.

Dynamic information such as a job start instruction is issued from the job manager 1519 directly to each manager, and static information such as device functions and job content is acquired by referring to the DIS 7102. Static and dynamic information from each manager and events are communicated to the job manager 1519 via the DIS 7102.

In a case where data from each manager is acquired by being set in the database of the DIS 7102, the internal data format of the DIS 7102 is in compliance with the Control API 1518 and therefore processing is executed to perform a conversion between the data format in compliance with Control API 1518 and a data format that can be understood by each manager. For example, in a case where setting of status data is performed from each manager, device-specific information is interpreted, converted to corresponding data defined by Control API 1518 and then written to the database of the DIS 7102.

In a case where data from each job manager 1519 is acquired by being set in the database of the DIS 7102, there is no conversion of data between the job manager 1519 and the DIS 7102. Further, updating of event data in the DIS 7102 is performed based upon the various event information reported from each manager.

Figure 16:
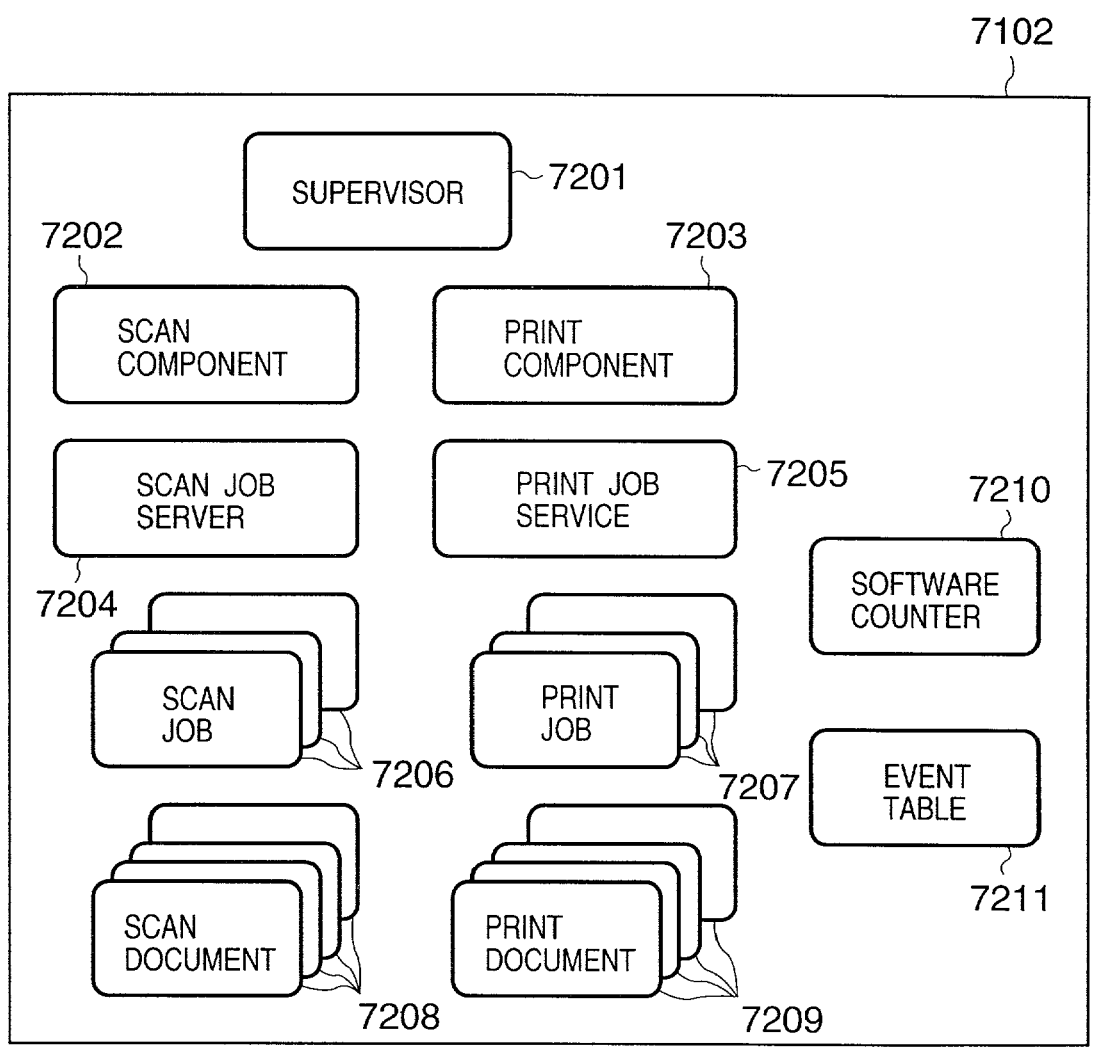
FIG. 16 is a diagram illustrating various databases held within a DIS.

FIG. 16 illustrates various databases stored in the DIS 7102. These databases will now be described.

A supervisor database 7201 stores status and user information regarding all devices. Information such as user IDs and passwords requiring back-up is stored on a hard disk or in a non-volatile storage device such as a back-up memory.

A scan component database 7202 and a print component database 7203 store data in correspondence with each existing component. For example, in case of a device comprising solely a printer, only the print component database will be present. In case of a device equipped with a facsimile function, a fax component database is stored. When initialization is performed, the corresponding managers set the device function and status in each component database.

A scan job service database 7204 and a print job service database 7205 are provided. In a manner similar to that of the component databases, the corresponding managers set the device functions and their support conditions in these job service databases when initialization is carried out.

Job databases and document databases will be described next. There are provided scan job databases 7206, print job databases 7207, scan document databases 7208 and print document databases 7209. A job database and a document database are acquired dynamically and initialized by the job manager 1519 whenever a job and the document accompanying the job are generated. The setting of necessary items also is performed. Before the processing of a job starts, each manager reads the item necessary for processing out of the job database and document database and then starts the job. When a job ends, the databases of these jobs and their accompanying document databases are released. Since a job may have more than one document, there are instances where a plurality of document databases are reserved for a certain job.

An event table database 7211 stores event information communicated from each manager, and a software counter (table) 7210 is for recording the number of scans and the number of print operations of the image processing apparatus 1001.

Events of which notification is given by the manager include status transition of a component, scan operation completion and various errors from the scan manager 1524, as well as status transition of a component, print operation completion, paper jam and opening of a paper cassette from the print manager 1526. Event IDs for identifying these events are determined in advance.

If notification of an event is issued from a manager, the DIS 7102 registers the event ID issued to the event table 7211 and, if necessary, detailed data associated with the event. If cancellation of an event is communicated from a manager, the DIS 7102 deletes the event data, for which cancellation has been specified, from the event table 7211.

In a case where event polling from the job manager 1519 has taken place, the DIS 7102 refers to the event table 7211 and sends back the ID of the currently occurring event and, if necessary, detailed data that accompanies this event. If events are not currently occurring, this fact is sent back.

If notification is given of a scan-operation complete event or print-operation complete event, the counter value of the user who is performing the scanning or printing operation is updated. In order that the value of the count will not be lost, as when power is inadvertently cut off, the count is written to a non-volatile storage medium such as a backed-up memory or hard disk back, whenever the count value is updated.

[Scanning Operation]

Figure 17:
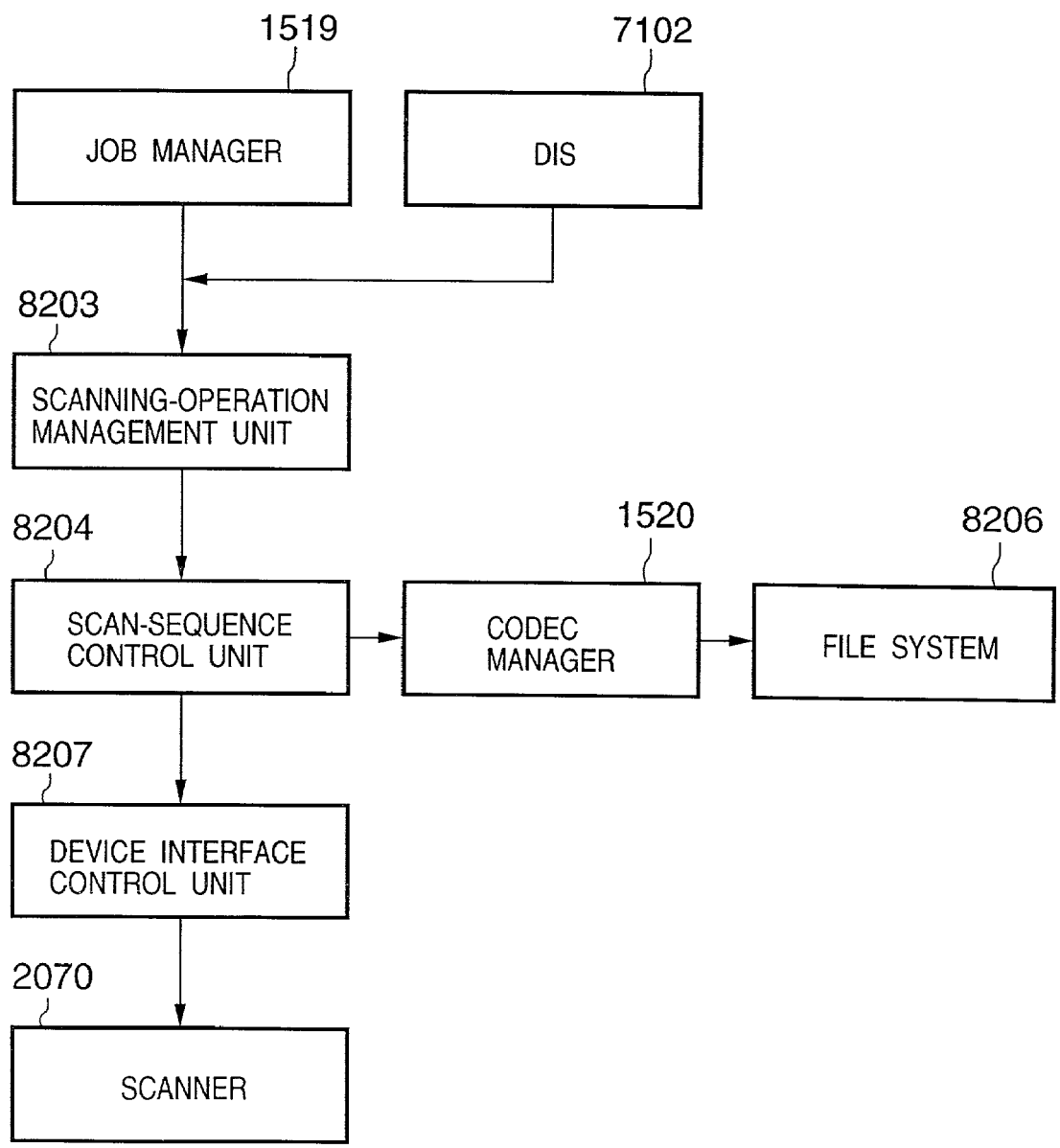
FIG. 17 is a diagram illustrating the structure of software relating to a scanning operation.

FIG. 17 is a diagram illustrating the software structure relating to scanning.

The job manager 1519 has a function for classifying and storing application-level requests. The DIS 7102 stores the parameters necessary for a scanning operation requested from the application level. Requests from an application are stored in the RAM 2002.

Figure 18:
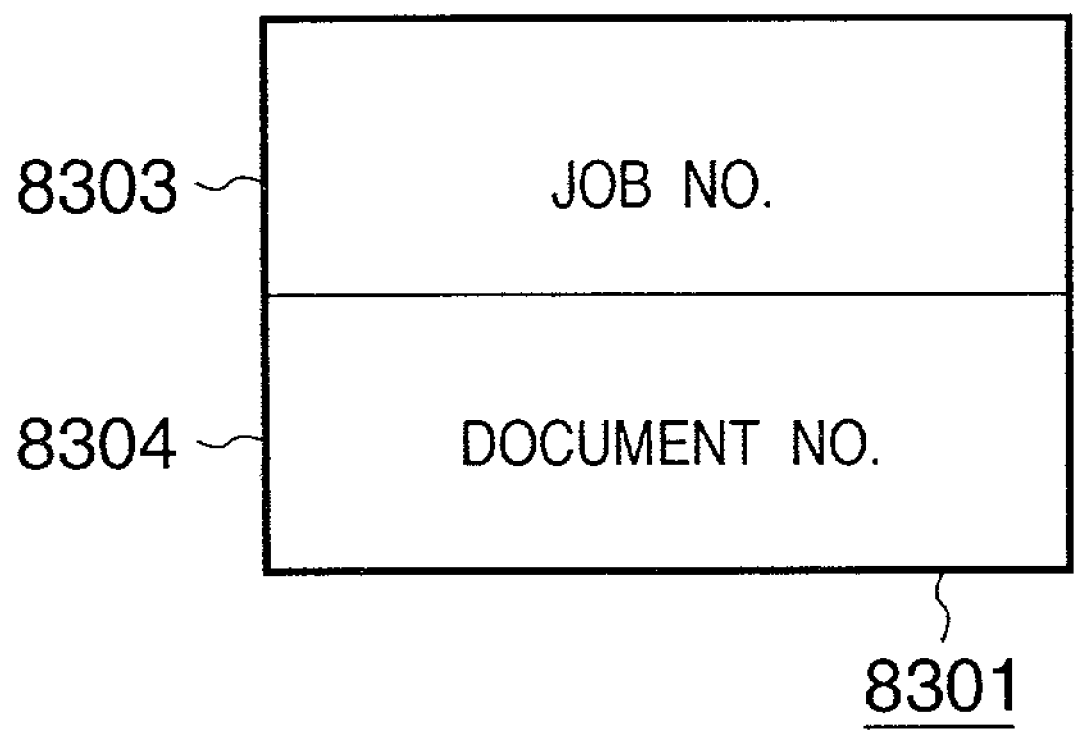
Figure 19:
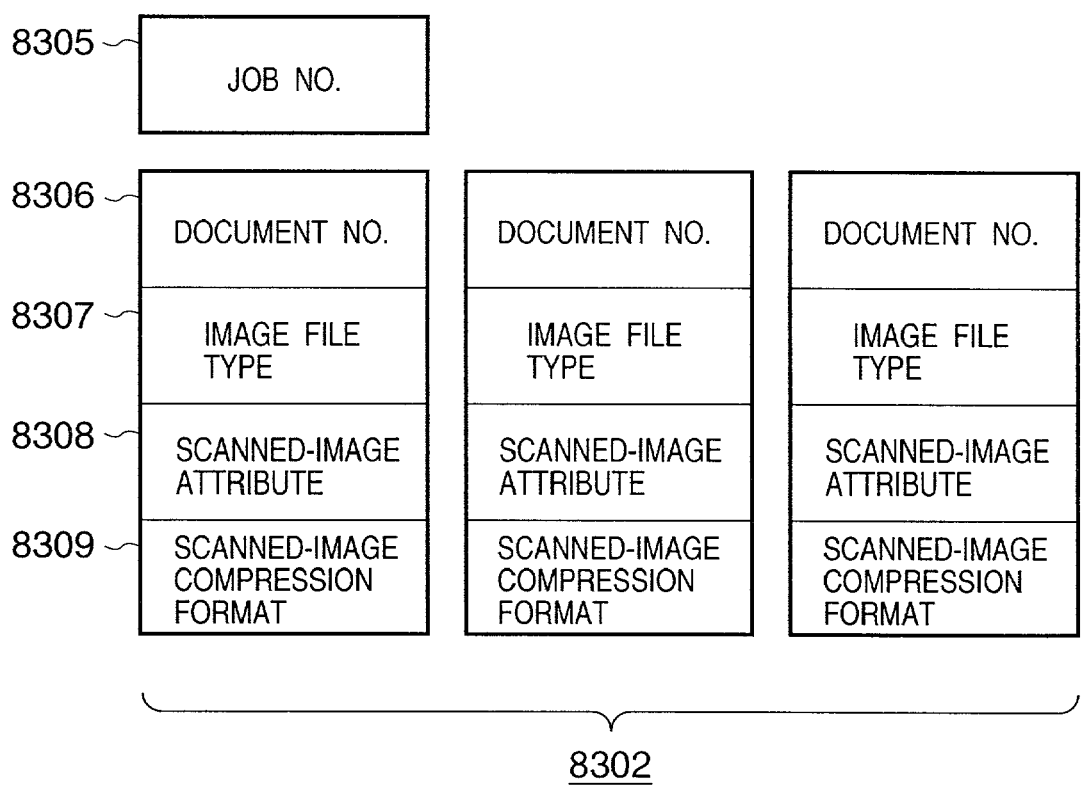
FIG. 19 is a diagram illustrating scanning parameters which a scanning operation management unit accepts from a DIS.

A scanning-operation management unit 8203 acquires information, which is necessary for scanning, from the job manager 1519 and DIS 7102. The scanning-operation management unit 8203 acquires table data 8301 consisting of a job number 8308 and document number 8304, shown in FIG. 18, from the job manager 1519, and acquires scan parameters 8302, shown in FIG. 19, from the DIS 7102 based upon the table data 8301. As a result, scanning based upon scan conditions requested from the application is performed.

The scanning-operation management unit 8203 delivers the scan parameters 8302 acquired from the DIS 7102 to a scan-sequence control unit 8204 in the order of the document numbers 8306. Upon receiving the scan parameters 8302, the scan-sequence control unit 8204 controls a device interface controller 8207 in accordance with the content of scanned image attributes 8308. As a result, by controlling the device interface 2020 connected to the image bus 2008 of FIG. 1, a control command is sent to the scanner 2070 via the cable 2071, whereby scanning is carried out.

The image obtained by scanning is delivered to the device interface 2020 via the cable 2071 and is stored in the RAM 2002 via the bus 2008. When scanning is completed and an image is stored in the RAM 2002, the scan-sequence control unit 8204 requests the codec manager 1520 to compress the scanned image, which has been stored in the RAM 2002, in accordance a scanned-image compression format 8309 stored in RAM 2002. Upon receiving the request, the codec manager module 1520 uses the image compression unit 2040 connected to the bus 2008 or the software compression module in the MMR codec 1523 to compresses the scanned image in accordance with the designation of the scanned-image compression format 8309 from the scan-sequence control unit 8204, and stores the compressed image in the RAM 2002 via a bus 2008.

When the scanned image compressed in the scanned-image compression format 8309 by the codec manager 1520 is stored in the RAM 2002, the scan-sequence control unit 8204 converts the compressed scanned image, which has been stored in the RAM 2002, to a file in accordance with an image file type 8307 of the scan parameters 8302. That is, the scan-sequence control unit 8204 requests a file system 8206 to convert the compressed scanned image, which has been stored in the RAM 2002, to a file format designated by the image file type 8307. In accordance with the image file type 8307, the file system 8206 converts the compressed image stored in the RAM 2002 to a file and transfers the file to the hard-disk drive 2004 via the system bus 2007. When the image in the form of a file is stored on the hard disk of the hard-disk drive 2004, the scan-sequence control unit 8204 sends back notification of completion of scanning to the scanning-operation management unit 8203. This indicates the completion of processing of one sheet of the document placed in the scanner 2070.

If at this time a document that has not yet been scanned is present in the scanner 2070 and there is a scan request from the job manager 1519, then the scanning-operation management unit 8203 again requests the scan-sequence control unit 8204 to perform scanning using the scan parameters 8302 stored in the DIS 7102.

If an unscanned document is not present in the scanner 2070, or if there is no scan request from the job manager 1519, the scanning-operation management unit 8203 notifies the job manager 1519 of the completion of scanning. This indicates the end of the scanning operation.

[Printing Operation]

The device interface 2020 has an internal dual-port RAM (abbreviated to "DPRAM" below] and sets parameters in a printer, acquires the status of the printer and exchanges printing control commands all via the DPRAM. Further, the device interface 2020 has a video controller and transmits image data (video data), which is supplied via the image bus 2008, to the printer 2095 via a cable 2096 in sync with a video clock VCLK and horizontal synchronizing signal HSYNC supplied from the printer 2095 via the cable 2096.

Figure 20:
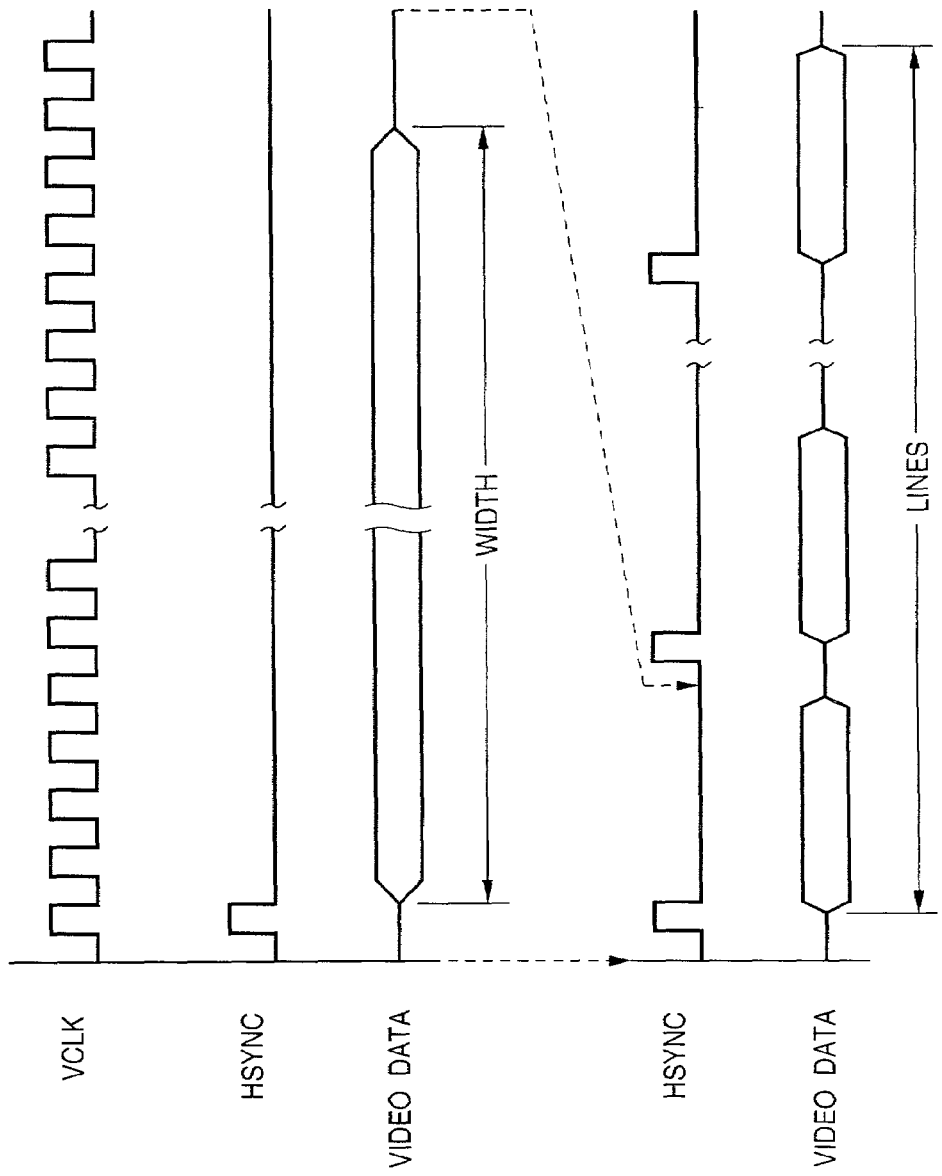
FIG. 20 is a diagram illustrating the transmission timing of video data transmitted by a device interface.

FIG. 20 is a timing chart illustrating the transmission timing. VCLK is supplied at all times and HSYNC is supplied in sync with the start of a print line. The video controller reads data in an amount equivalent to the set image width (WIDTH) out of the RAM 2002 and outputs the data to the cable 2096 as video data. After the output of video data of amount equivalent to WIDTH is repeated for the designated number of lines (LINES), the video controller generates an IMAGE_END interrupt.

As described earlier, when a print-job command is applied to the control API 1518 from an application program, the control API 1518 delivers this command to the job manager 1519 of the control level as a job. Furthermore, the job manager 1519 stores the job settings in the DIS 7102 and instructs the printer manager 1526 to start the printing job. Upon accepting the job, the print manager 1526 reads information, which is necessary for job execution, out of the DIS 7107 and sets this information in the printer via the printer driver 1527 and DPRAM.

If an image has been compressed, the print manager module 1526 requests the codec manager 1520 to expand the image. In accordance with this request, the codec manager 1520 expands the image file into a bitmap image by an expansion method (JPEG, MMR, etc.) specified by the printer manager 1526. The expanded image is stored in the RAM 2002.

Figure 21:
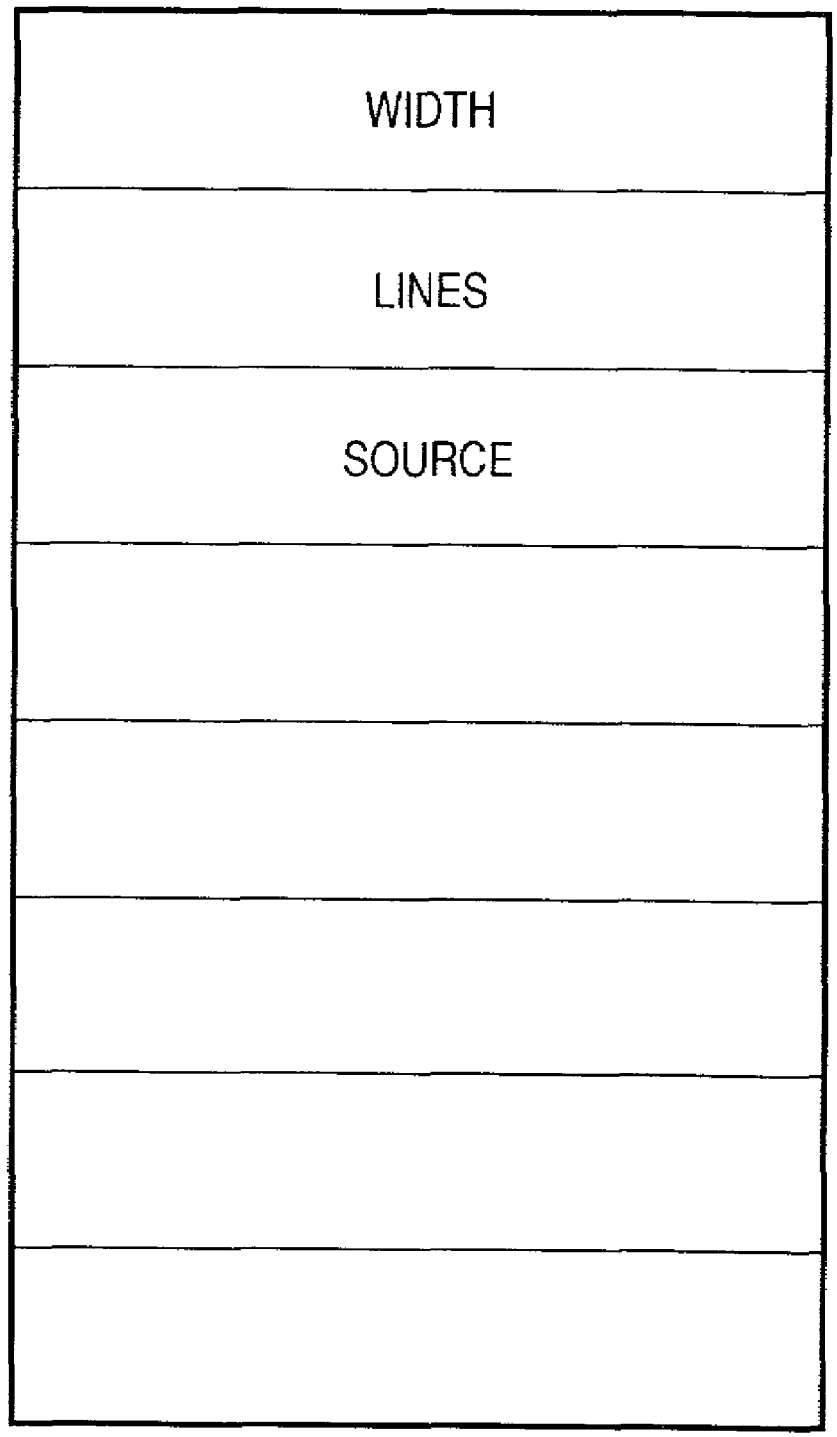
FIG. 21 is a diagram illustrating configuration items of the device interface.
Figure 22:
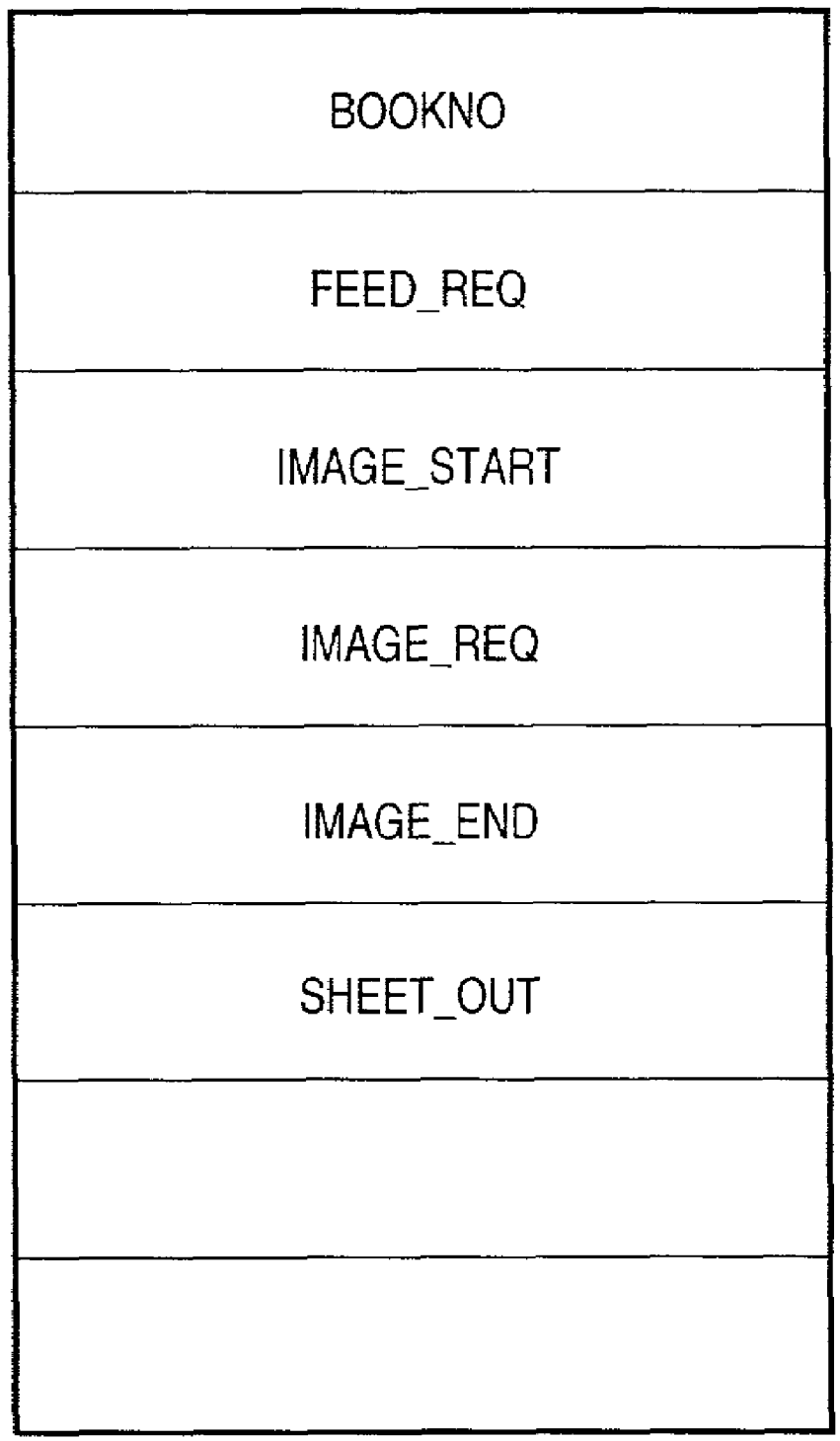
FIG. 22 is a diagram illustrating configuration items, control commands and status, which involve use of a DPRAM.

FIG. 21 is a diagram showing the setting items of the device interface 2020, and FIG. 22 is a diagram showing the setting items, control commands and status sent via the DPRAM.

Described next as a concrete example of printing of a bitmap image will be an operation in which a single copy of two pages of a bi-level image of letter size (11"×8.5") are printed by a 600-dpi printer 2095.

When preparation of the bitmap image is finished, the print manager 1526 calculates the image width, in this case an image data size (WIDTH) one side of which is 8.5 inches:

$$WIDTH = 8.5 \times 600/8 \approx 630 \text{ bytes}$$

The print manager then calculates the number of lines (LINES) as follows:

$$LINES = 11 \times 600 = 6600 \text{ lines}$$

These calculated values and the source address of the RAM 2002 storing the image of the first page applied thereto are set at WIDTH, LINES and SOURCE shown in FIG. 21. Though preparation of the image output is completed at this point, the device interface 2020 does not output the image data because HSYNC is not being supplied by the printer 2095 (though VCLK is being supplied as a matter of course).

Next, the print manager 1526 writes "1", which is the number of output copies, to a prescribed address BookNo of the DPRAM shown in FIG. 22. The print manager thenceforth makes true a paper-feed request FEED_REQ corresponding to the first page and waits for IMAGE_REQ from the printer 2095 to become true. When IMAGE_REQ becomes true, the print manager makes FEED_REQ false and makes IMAGE_START true. When IMAGE_START becomes true, the printer 2095 starts supplying HSYNC and the interface 2020, which has been waiting for HSYNC, outputs the image.

Upon detecting the trailing edge of the printing paper, the printer 2095 makes IMAGE_REQ false and makes IMAGE_END true. When the printing paper is discharged, the printer makes SHEET_OUT true. When IMAGE_END corresponding to the first page becomes true, the print manager 1526 makes IMAGE_START false and sets WIDTH, LINES, SOURCE of the second page in the printer driver 1527, makes FEED_REQ true again and waits for IMAGE_REQ to become true.

If IMAGE_START becomes false, the printer 2095 makes IMAGE_END and SHEET_OUT false. Operation after IMAGE_REQ corresponding to the second page becomes true is the same as operation for the first page.

[Automatic Density Adjustment when Image is Scanned]

When the user employs the user interface 1501 to instruct the transmission of color and monochrome images, the command is communicated to the codec manager 1520 and scanner manager 1524 via the universal-send module 1504, which is the broadcast distribution application, and the control API 1518. The processing executed by the scanner image processor 2080 when the color image and monochrome image are scanned is configured by the codec manager 1520.

Figure 23:
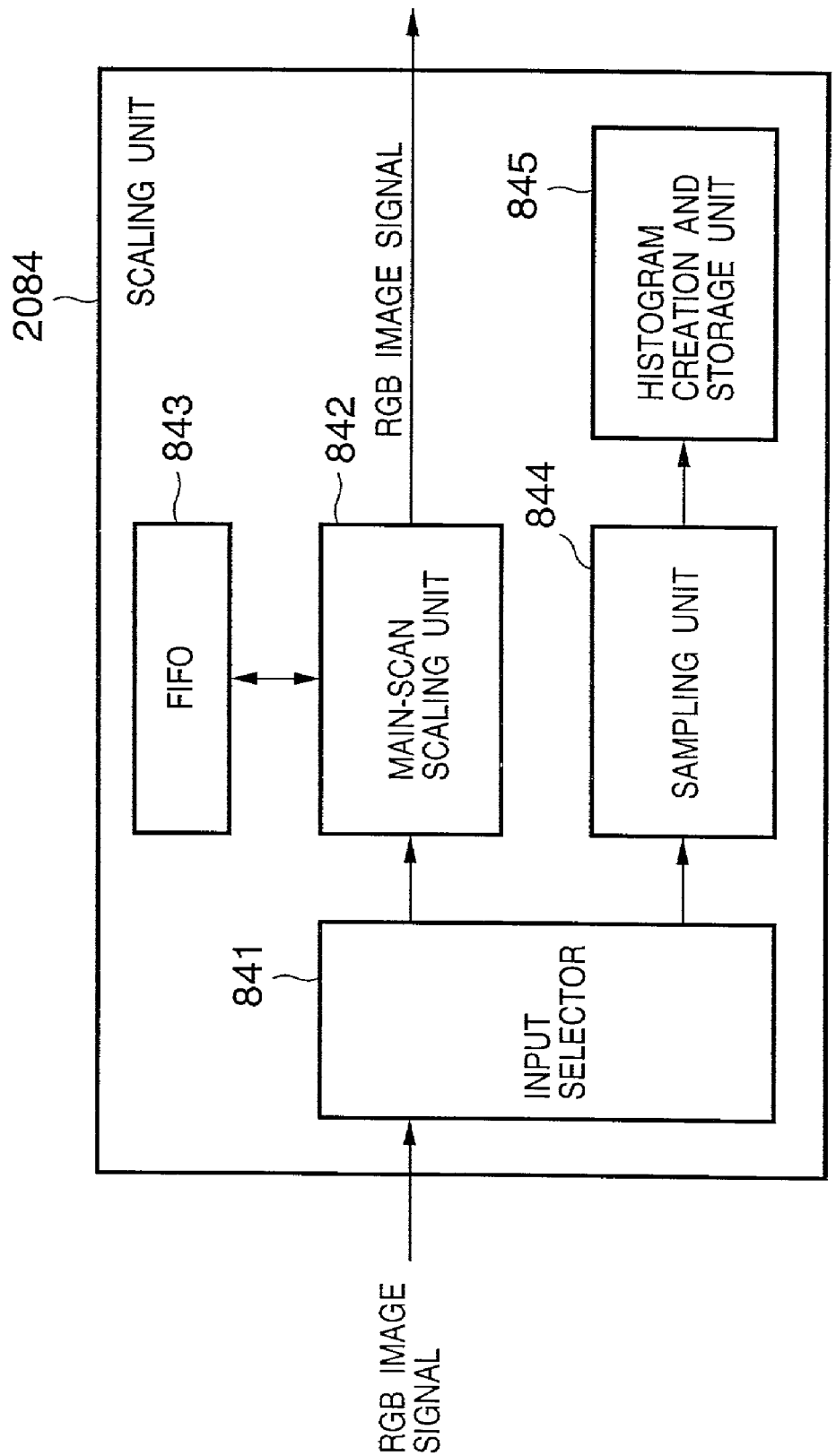
FIG. 23 is a block diagram illustrating the details of the structure of a scaling unit shown in FIG. 4.

FIG. 23 is a block diagram illustrating the details of the scaling processor 2084. Upon receiving an RGB image signal, an input selector 841 inputs the received image signal to a main-scan scaling unit 842 or to a sampling unit 844. The main-scan scaling unit 842 uses a first-in first-out (FIFO) memory 843 to perform scaling of the image in the main-scan direction thereof and delivers the scaled signal to the scanner image processor 2080, which is the next stage.

The sampling unit 844, on the other hand, is used at the time of prescanning. More specifically, when scaling is performed, the sampling unit 844 samples the image of the original document to examine the background level of the document image. The sampling density can be set in the sampling unit 844 via the CPU 2001.

Figure 24:
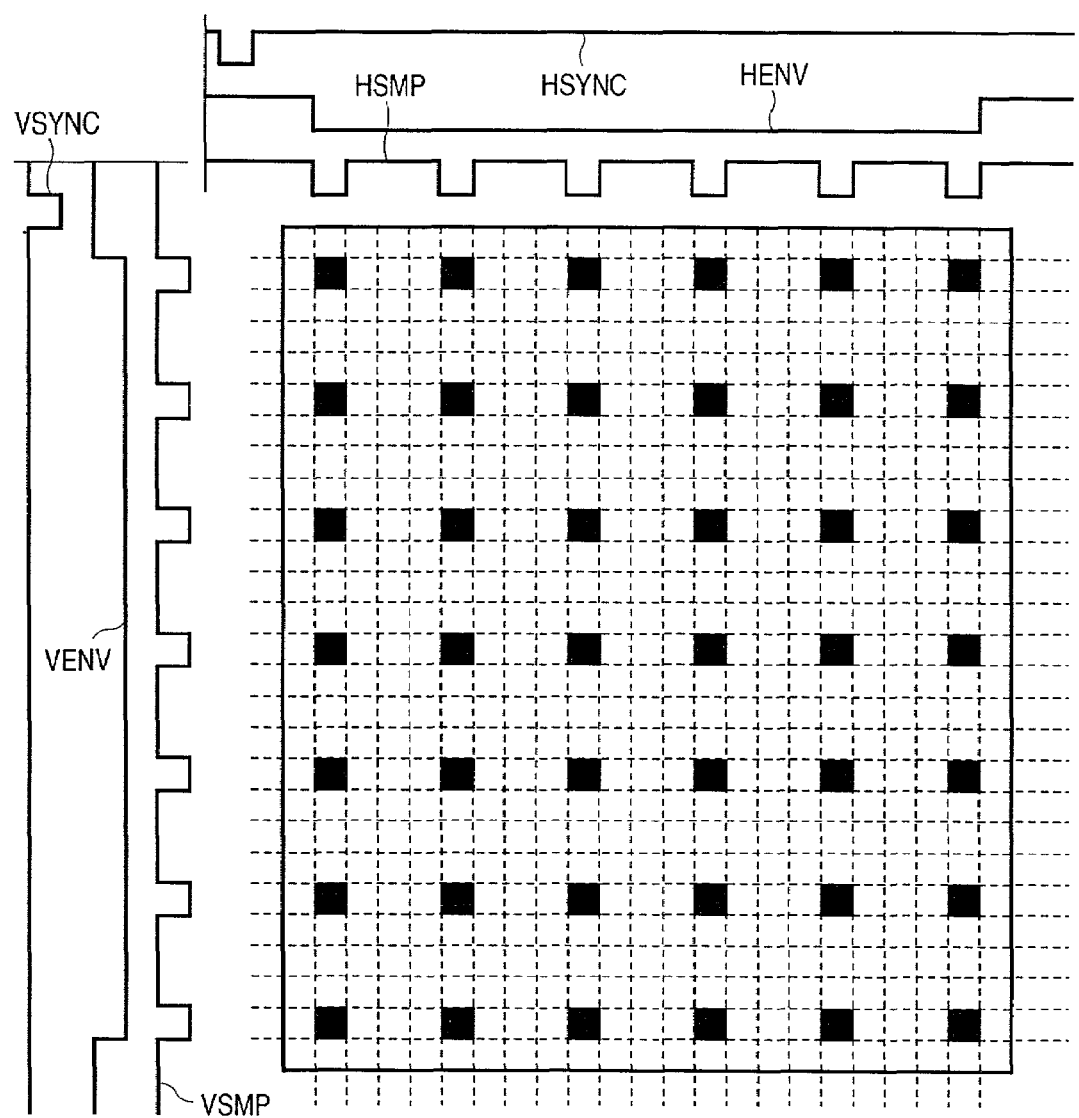
FIG. 24 is a diagram illustrating the relationship between an entered document image and sampling.

FIG. 24 is a diagram illustrating the relationship between the entered document image and sampling. Input to the sampling unit 844 in addition to the image signal are the horizontal synchronizing signal HSYNC, a horizontal-image effective interval signal HENV, an image clock VCLK, which is not shown in FIG. 24, a vertical synchronizing signal VSYNC and a vertical-image effective interval signal VENV. The sampling unit 844 has a register for deciding at what pixel intervals sampling is to be performed in the horizontal direction and a register for deciding at what line intervals sampling is to be performed in the vertical direction. If the value in a counter for counting VCLK in the HENV interval upon being cleared to zero in sync with the signal HSYNC is a multiple of the pixel sampling interval and the value in a counter for counting HSYNC in the VENV interval upon being cleared to zero in sync with the signal VSYNC is a multiple of the line sampling interval, then pixels are sampled at this timing and are sent to a histogram creation and storage unit 845. HSMP shown in FIG. 24 is a horizontal sampling signal and VSMP is a vertical sampling signal. As a result, the pixels indicated by the hatching in FIG. 24 are sampled.

Figure 25:
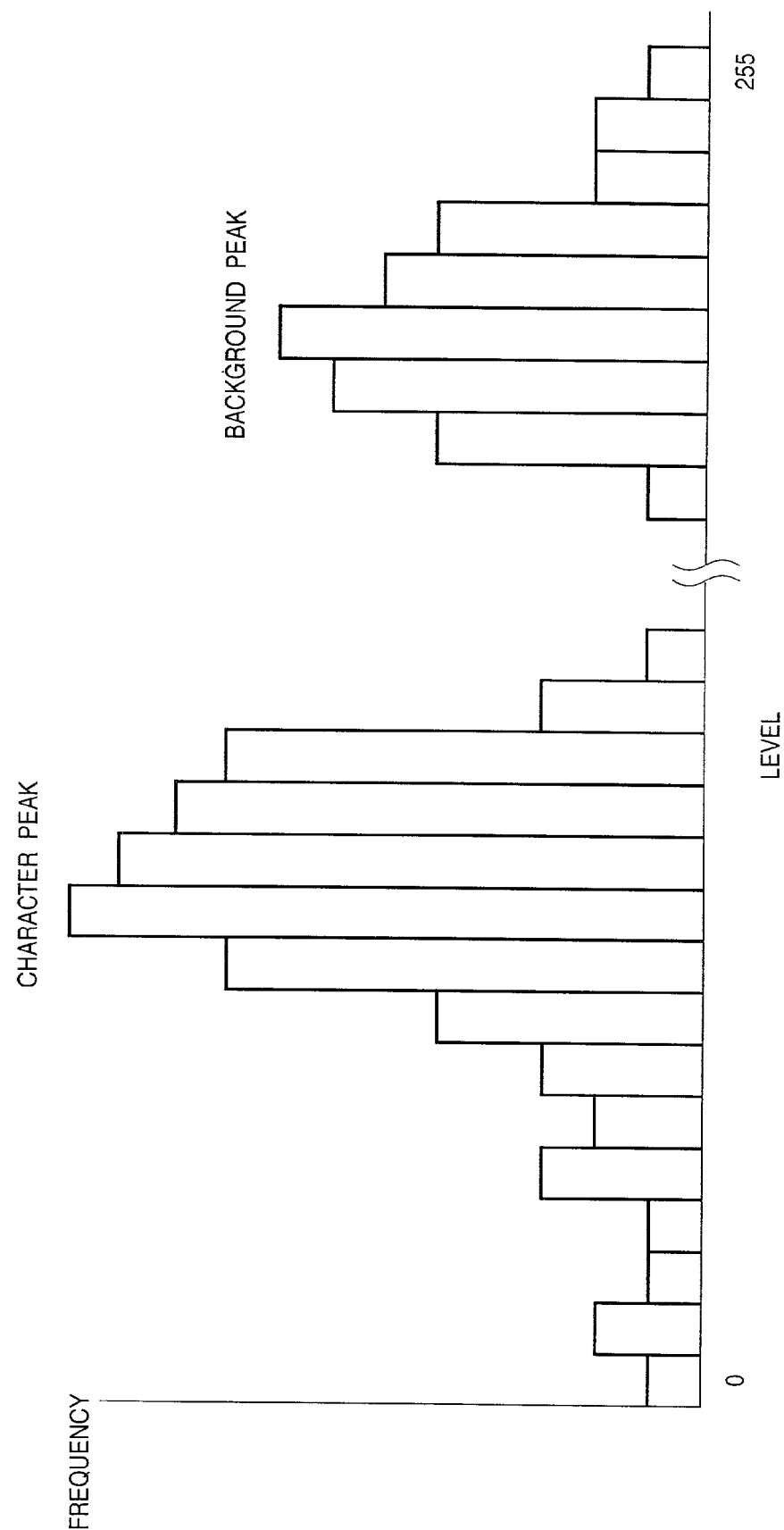
FIG. 25 is a diagram illustrating an example of the histogram of an image.

The histogram creation and storage unit 845 creates histograms for respective ones of the R, G, B signals from the image data received from the sampling unit 844. FIG. 25 is a diagram illustrating an example of the histogram of an image. Since the RGB signal is a luminance signal, level 0 represents black and level 255 represents white. In the example of FIG. 25, the histogram is that of an image of a document such as a newspaper, in which the color of the paper is gray and characters are printed in black. The peak of the histogram indicating the background of the newspaper is at a level slightly removed from 255, and the peak of the histogram indicating a black character is in the vicinity of level 0. The level of the background is found from the peak indicative of the background and the document image is scanned in such a manner that the background level will not be reflected in the read image.

Figure 26:
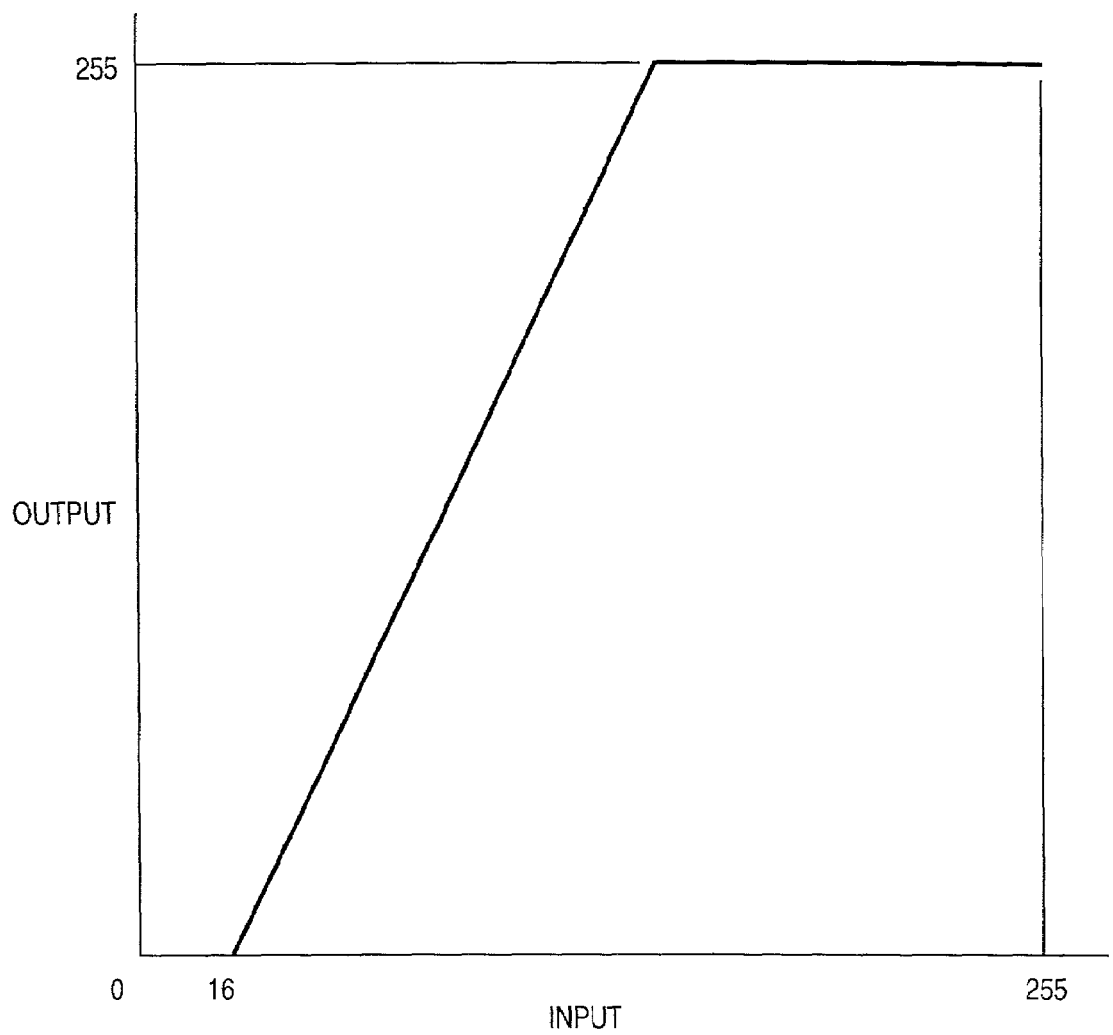
Figure 27:
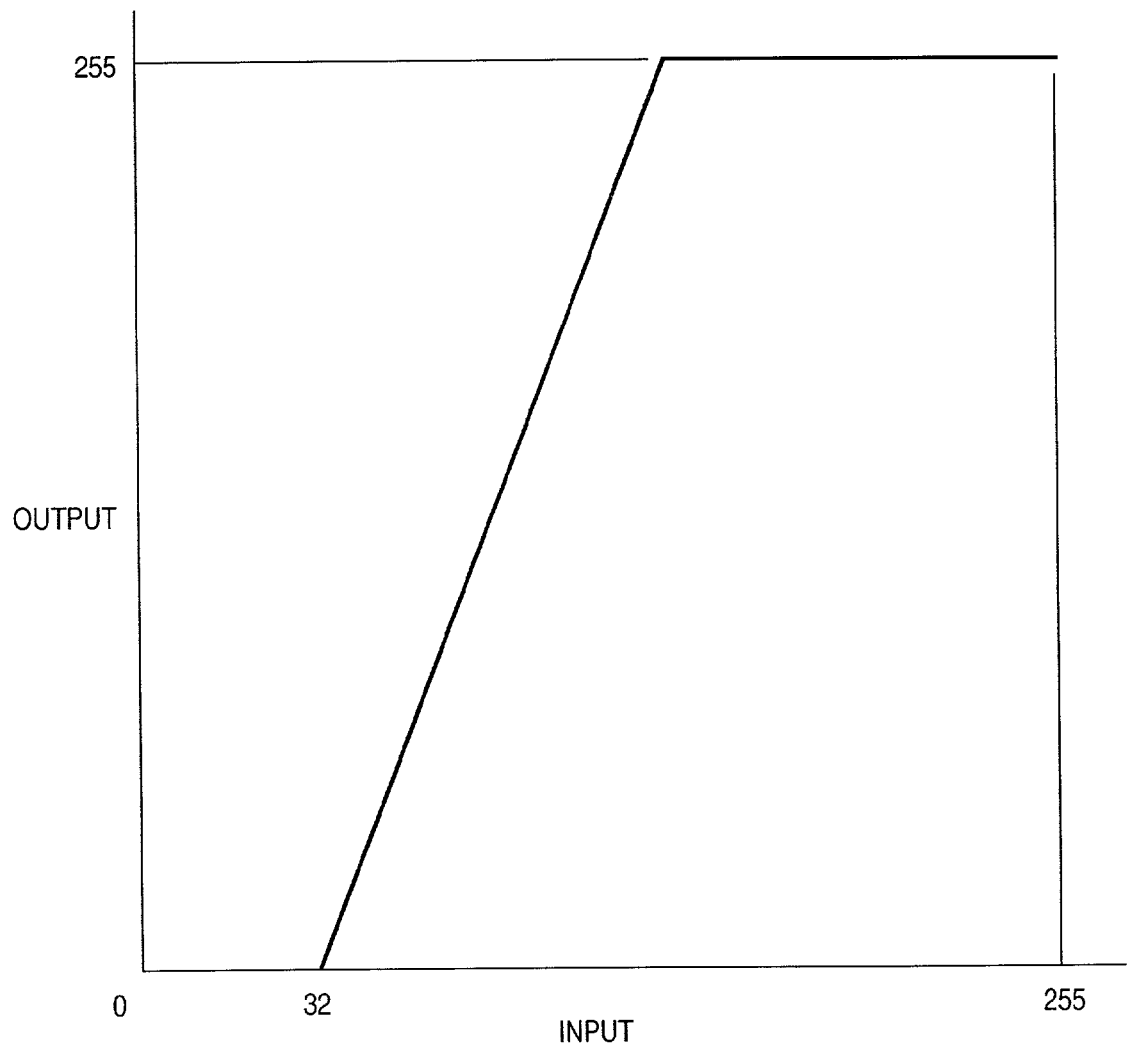
Figure 28:
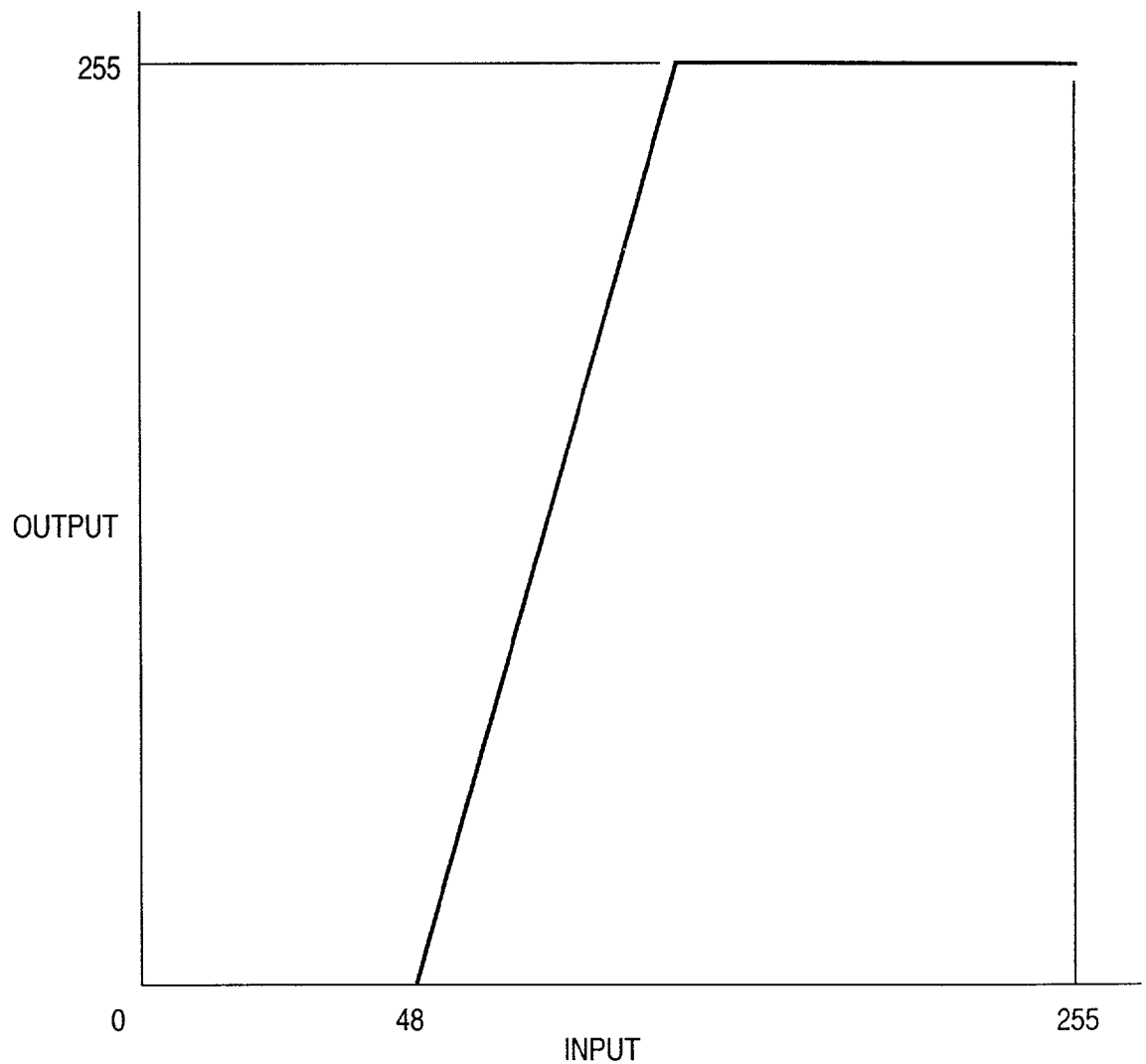

FIGS. 26 to 28 are diagrams illustrating examples of gamma correction curves for density data. By using the table 2085, scanned image data is converted to density data by a luminance-density conversion (logarithmic conversion) before a gamma correction is applied, and then background is eliminated by applying a gamma correction curve of the kind shown FIGS. 26 to 28. In a case where luminance data is output from the scanner image processor 2080, background is removed by luminance-data gamma correction tables of the kind shown in FIGS. 29 to 31.

Figure 32:
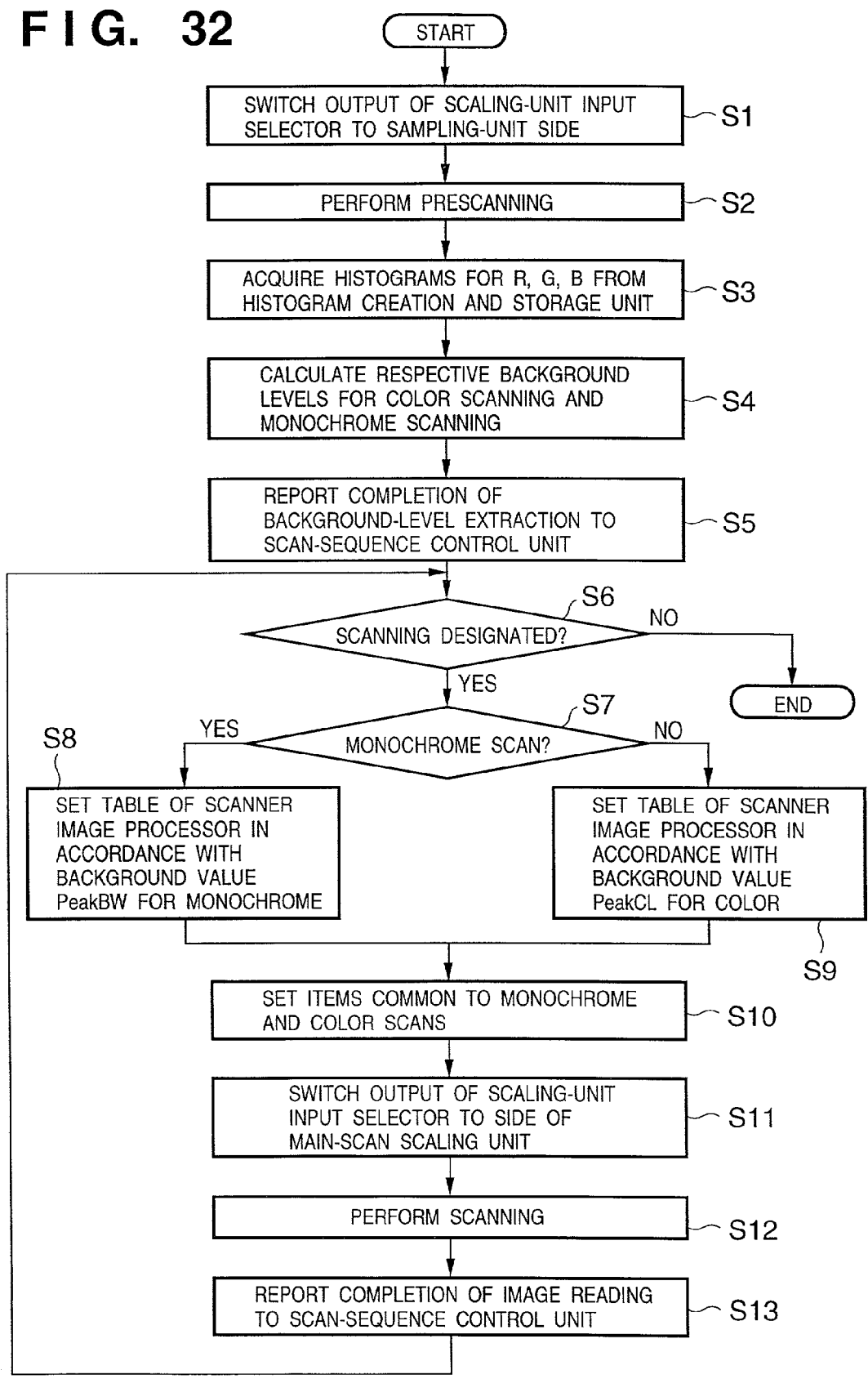
FIG. 32 is a flowchart illustrating the processing procedure of a CODEC manager.

FIG. 32 is a flowchart illustrating processing executed by the codec manager 1520.

If an automatic density adjustment based upon prescanning has been designated, the codec manager 1520 switches the output of the input selector 841 of scaling processor 2084 to the side of the sampling unit 844 at step S1 and then notifies the scanner manager 1524 of the completion of preparations. The prescan operation is performed at step S2.

Following the end of prescanning, the codec manager 1520 acquires the R, G, B histograms from the histogram creation and storage unit 845 at step S3 and calculates the background levels for the color scan and monochrome scan at step S4. More specifically, with regard to each of the signals R, G, B, the codec manager 1520 groups frequencies into 16 levels each. That is, the sum of the frequencies from level 0 to level 15 is stored as an array element 0, the sum of the frequencies from level 16 to level 31 is stored as an array element 1, . . . , and the sum of the frequencies from level 240 to level 255 is stored as an array element 16 to effect a conversion to 16-stage histograms R[16], G[16], B[16] (16 array elements 0 to 15). Next, in accordance with the following equations, the codec manager 1520 detects array elements Rpeak, Gpeak and Bpeak corresponding to peaks between array elements 13 and 15 of the above-mentioned array elements:

$$Rpeak = \max(R[I])$$

$$Gpeak = \max(G[I])$$

$$Bpeak = \max(B[I])$$

where I=13, 14, 15.

The smallest value among these is preserved as a background peak value PeakCL for the color scan, and Gpeak is preserved as a background peak value PeakBW for the monochrome scan.

$$PeakCL = \min(Rpeak, Gpeak, Bpeak)$$

$$PeakB2 = Gpeak$$

Scanning becomes possible at the moment the above-described processing ends. The codec manager 1520, therefore, notifies the scan-sequence control unit 8204 (FIG. 17) at step S5 of the fact that extraction of the background level is finished. If scanning is subsequently designated, control proceeds from step S6 to step S7. Control proceeds from step S7 to step S8 if monochrome scanning is designated and from step S7 to step S9 if color scanning is designated.

The table 2085 of the scanner image processor 2080 is configured by the codec manager 1520 at step S8 in accordance with background peak value PeakBW for the monochrome scan. For example, the gamma correction curves shown in FIGS. 26, 27 and 28 are set in the table 2085 if PeakBW=15, PeakBW=14 and PeakBW=13 hold, respectively.

Figure 29:
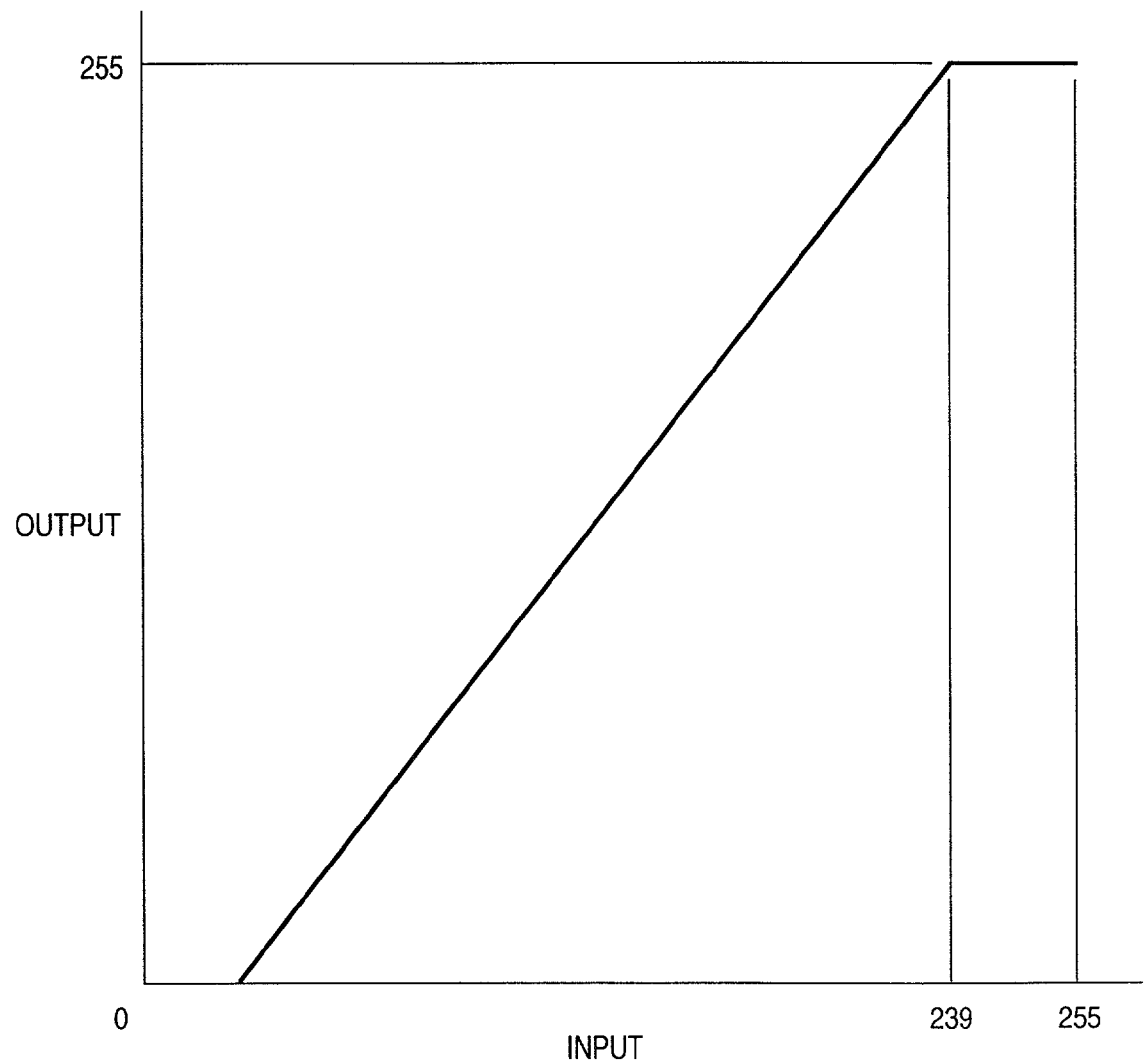
Figure 31:
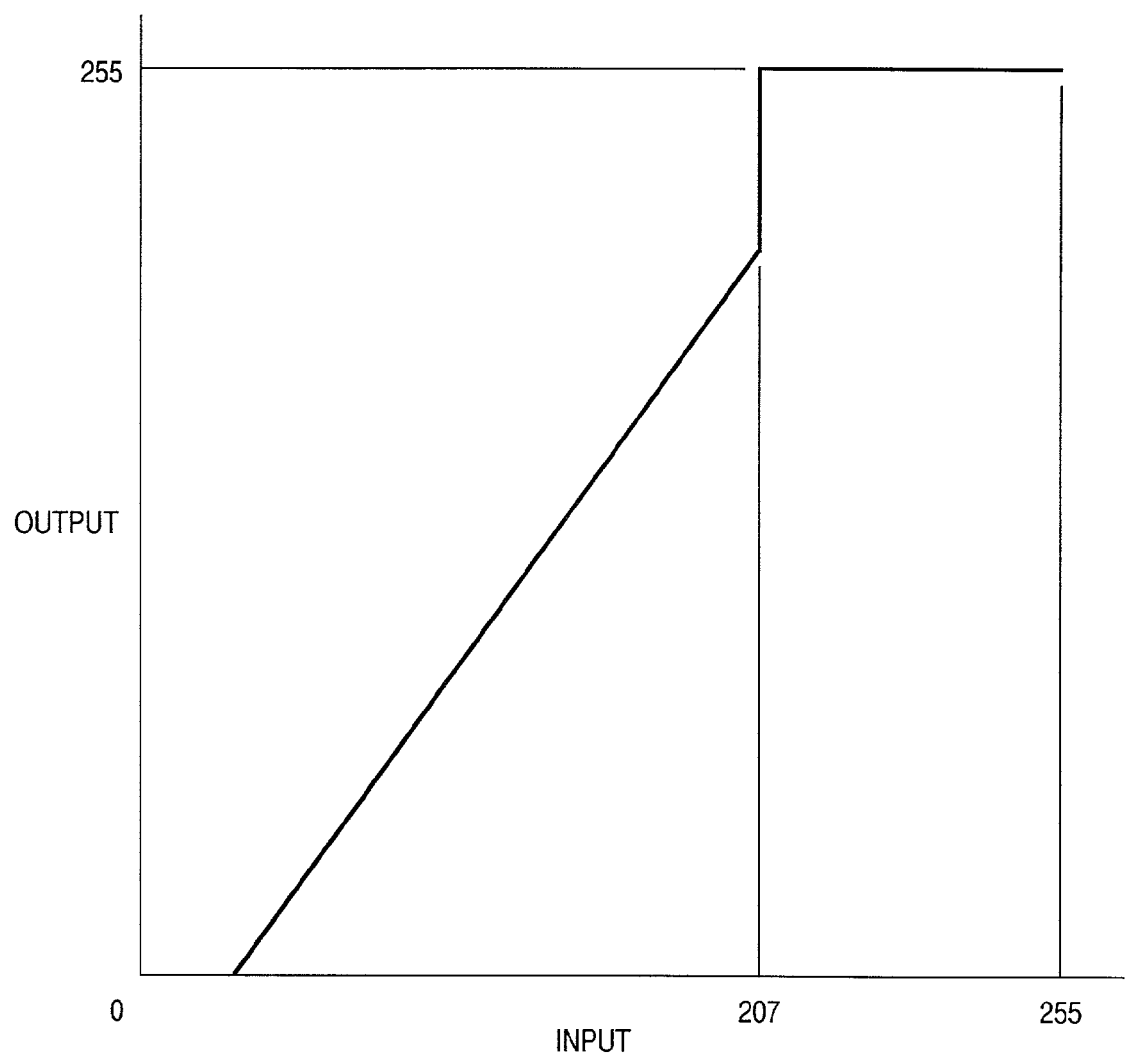

Further, the table 2085 is configured by the codec manager 1520 at step S9 in accordance with background peak value PeakCL for the color scan. For example, the gamma correction curves shown in FIGS. 29, 30 and 31 are set in the table 2085 if PeakCL=15, PeakCL=14 and PeakCL=13 hold, respectively.

Next, settings common to the monochrome and color scans, e.g., scaling-processing settings, are made by the codec manager 1520 at step S10, the output of the input selector 841 is switched over to the side of the main-scan scaling unit 842 at step S11, and then the fact that the settings have been completed is reported to the scanner manager 1524. Scanning is carried out at step S12.

After the scanning operation ends, the codec manager 1520 notifies the scan-sequence control unit 8204 at step S13 of the fact that reading of the image has been completed. Control returns to step S6 in order to deal with the next scanning designation. If there is no next scanning designation, however, processing is exited.

Thus, the illustrated embodiment is such that in a case where an automatic density adjustment is applied to the same document and the document is subjected to the reading of color and monochrome images, the background level for the color image and the background level for the monochrome image can be acquired by a single prescan. As a result, it is unnecessary to perform an automatic density adjustment whenever a color image and monochrome image are to be read from the same document. This makes it possible to raise processing speed.

It should be noted that the method of extracting background described above is one example. Any background extraction method that is suited to the reading of color images and/or monochrome images may be employed.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for obtaining a color and/or monochrome image of an original image by scanning the original image, comprising:
    a scanner that scans the original image;
    an extractor that generates image signals of red, green and blue color components of the original image by prescanning of one time, before the original image is scanned by the scanner, and extracts first background information for a color image using the image signals of the red, green and blue color components and second background information for a monochrome image using the signal of the green color component; and
    a controller that sets image processing conditions of the scanner to obtain image signals of the red, green and blue color components based upon the first or second background information extracted by the extractor.

2. The apparatus according to claim 1, wherein the extractor performs the prescanning once for one original.

3. An image processing apparatus comprising:
    a scanner that generates a prescanned image of an original image by prescanning of one time, and generates a color and/or monochrome image of the original image by scanning;
    a generator that generates histograms of image signals of red, green and blue color components contained in the prescanned image;
    an extractor that extracts first background information for a color image using the histograms of the red, green and blue color components and second background information for a monochrome image using the histogram of the green color component; and
    a controller that sets image processing conditions of the scanning of said scanner based upon the first or second background information extracted by the extractor.

4. The apparatus according to claim 3, wherein the scanner performs the prescanning once for one original.

5. The apparatus according to claim 3, wherein if acquisition of the color image has been designated, said controller sets the image processing conditions of the scanning in accordance with the first background information in said scanner.

6. The apparatus according to claim 3, wherein if acquisition of the monochrome image has been designated, said controller sets the image processing conditions of the scanning in accordance with the second background information in said scanner.

7. The apparatus according to claim 3, wherein said extractor divides the histograms into a plurality of areas of a prescribed width, discriminates an area, for which the sum of frequencies is indicative of a peak value, with regard to each of the color components, and extracts, from the obtained areas of each of the color components, an area corresponding to a lower image-signal level, this area serving as the first background information for the color image.

8. The apparatus according to claim 7, wherein said extractor extracts an area of the green color component, which has been obtained by the discrimination, as the second background information for the monochrome image.

9. An image processing method of obtaining a color and/or monochrome image of an original image by scanning the original image, comprising the steps of:
    generating image signals of red, green and blue color components of the original image by prescanning of one time, before the original image is scanned by a scanner;
    extracting first background information for a color image using the image signals of the red, green and blue color components and second background information for a monochrome image using the image signal of the green color component; and
    setting image processing conditions of the scanner to obtain image signals of the red, green and blue color components based upon the first or second background information extracted in the extracting step.

10. The method according to claim 9, wherein the extracting step performs the prescanning once for one original.

11. An image processing method comprising the steps of:
    generating, by prescanning of one time, a prescanned image of an original image, which is to be scanned, using a scanner that is for scanning the original image to obtain a color and/or monochrome image of the original image;
    generating histograms of image signals of red, green and blue color components contained in the prescanned image;
    extracting first background information for a color image using the histograms of the red, green and blue color components and second background information for a monochrome image using the histogram of the green color component; and
    setting image processing conditions of the scanning of the scanner based upon the first or second background information extracted in the extracting step.

12. The method according to claim 11, wherein the first generating step performs the prescanning once for one original.

13. A computer program product stored on a computer-readable medium comprising computer program code for an image processing method of obtaining a color and/or monochrome image of an original image by scanning the original image, said method comprising the steps of:
    generating image signals of red, green and blue color components of the original image by prescanning of one time, before the original image is scanned by a scanner;
    extracting first background information for a color image using the image signals of the red, green and blue color components and second background information for a monochrome image using the image signal of the green color component; and
    setting image processing conditions of the scanner to obtain image signals of the red, green and blue color components based upon the first or second background information extracted in the extracting step.

14. The product according to claim 13, wherein the extracting step performs the prescanning once for one original.

15. A computer program product stored on a computer-readable medium comprising computer program code for an image processing method, said method comprising the steps of:
    generating, by prescanning of one time, a prescanned image of an original image, which is to be scanned, using a scanner that is for scanning the original image to obtain a color and/or monochrome image of the original image;

generating histograms of image signals of red, green and blue color components contained in the prescanned image;

extracting first background information for a color image using the histograms of the red, green and blue color components and second background information for a monochrome image using the histogram of the green color component; and setting image processing conditions of the scanning of the scanner based upon the first or second background information extracted in the extracting step.

16. The product according to claim 15, wherein the first generating step performs the prescanning once for one original.

* * * * *

UNITED STATES PATENT AND TRADEMARK OFFICE
CERTIFICATE OF CORRECTION

PATENT NO. : 7,099,042 B2 Page 1 of 1
APPLICATION NO. : 09/795122
DATED : August 29, 2006
INVENTOR(S) : Yaguchi It is certified that error appears in the above-identified patent and that said Letters Patent is hereby corrected as shown below:

COLUMN 1:
Line 60, "and" should read --an--.

COLUMN 4:
Line 17, "devices," should read --device,--.

COLUMN 7:
Line 31, "is" should read --are--.
Line 34, "was" should read --were--.

COLUMN 14:
Line 52, "a" should read --with a--.

COLUMN 17:
Line 43, "shown" should read --shown in--.

Signed and Sealed this

Third Day of June, 2008

JON W. DUDAS
*Director of the United States Patent and Trademark Office*